14 Sheets—Sheet 1.

P. H. WATSON & E. S. RENWICK.

Harvester and Binder.

No. 9,930.

Patented Dec. 6, 1853.

14 Sheets—Sheet 2.
P. H. WATSON & E. S. RENWICK.
Harvester and Binder.
No. 9,930.
Patented Dec. 6, 1853.
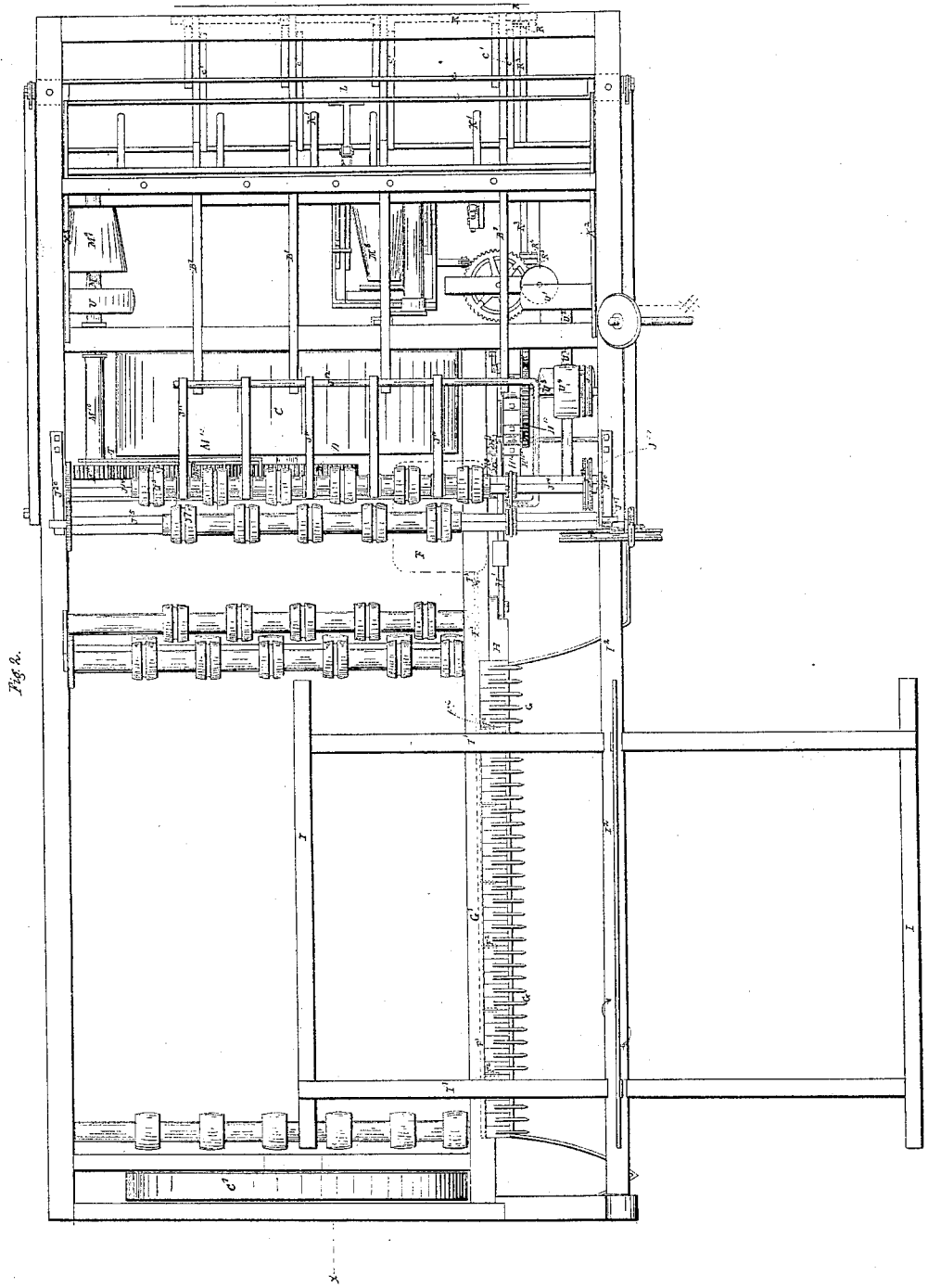

14 Sheets—Sheet 3.
P. H. WATSON & E. S. RENWICK.
Harvester and Binder.
No. 9,930. Patented Dec. 6, 1853.
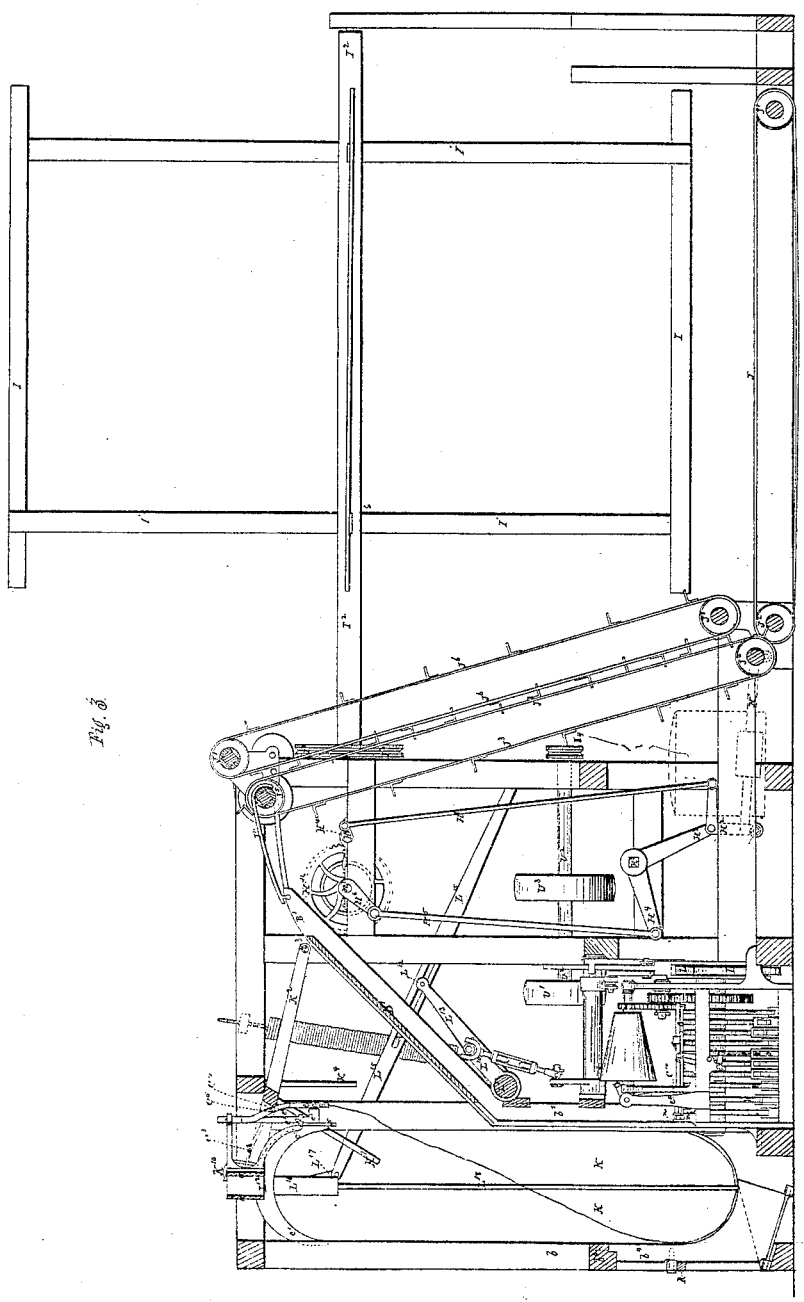

14 Sheets—Sheet 4.
P. H. WATSON & E. S. RENWICK.
Harvester and Binder.
No. 9,930. Patented Dec. 6, 1853.
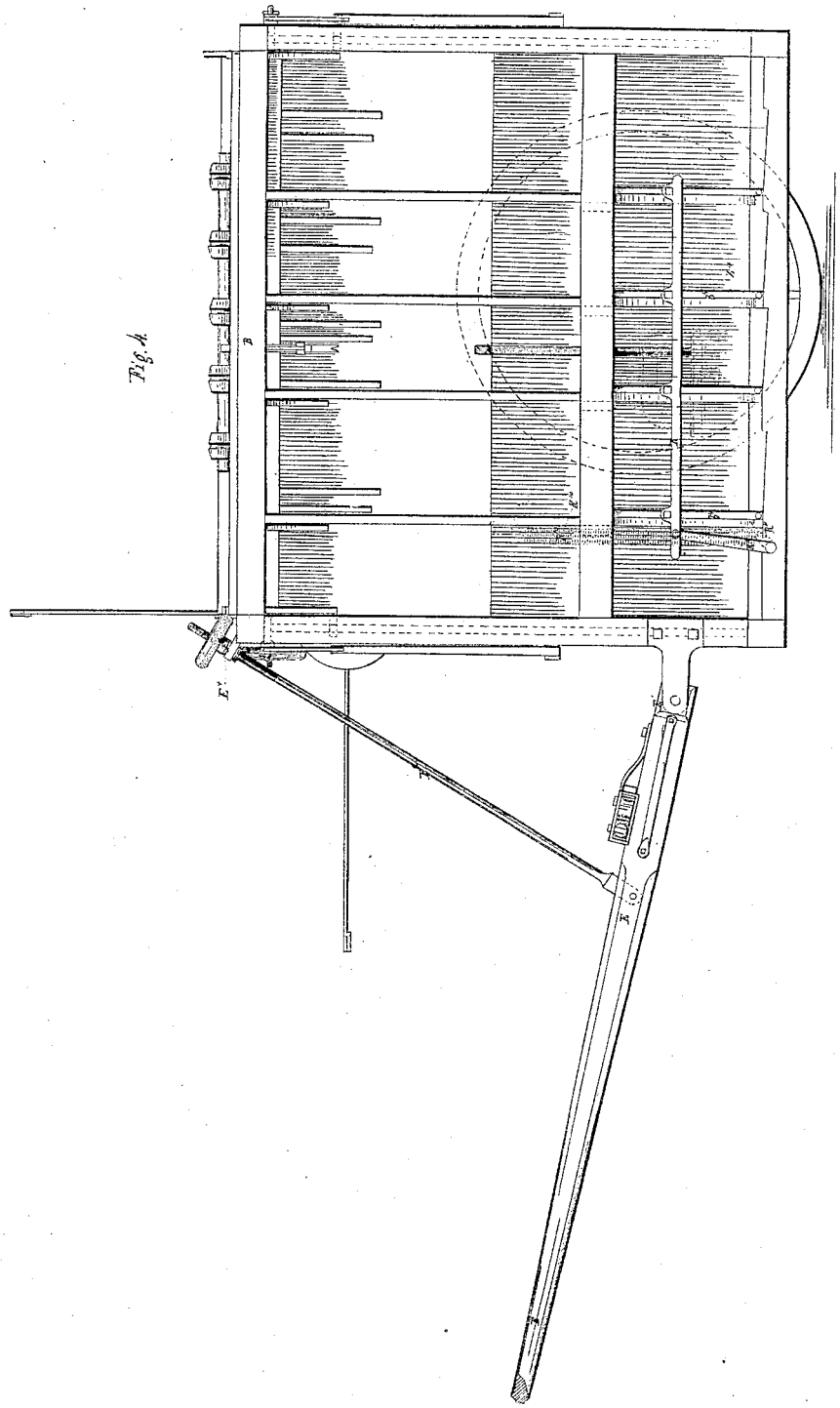

14 Sheets—Sheet 5.
P. H. WATSON & E. S. RENWICK.
Harvester and Binder.
No. 9,930. Patented Dec. 6, 1853.
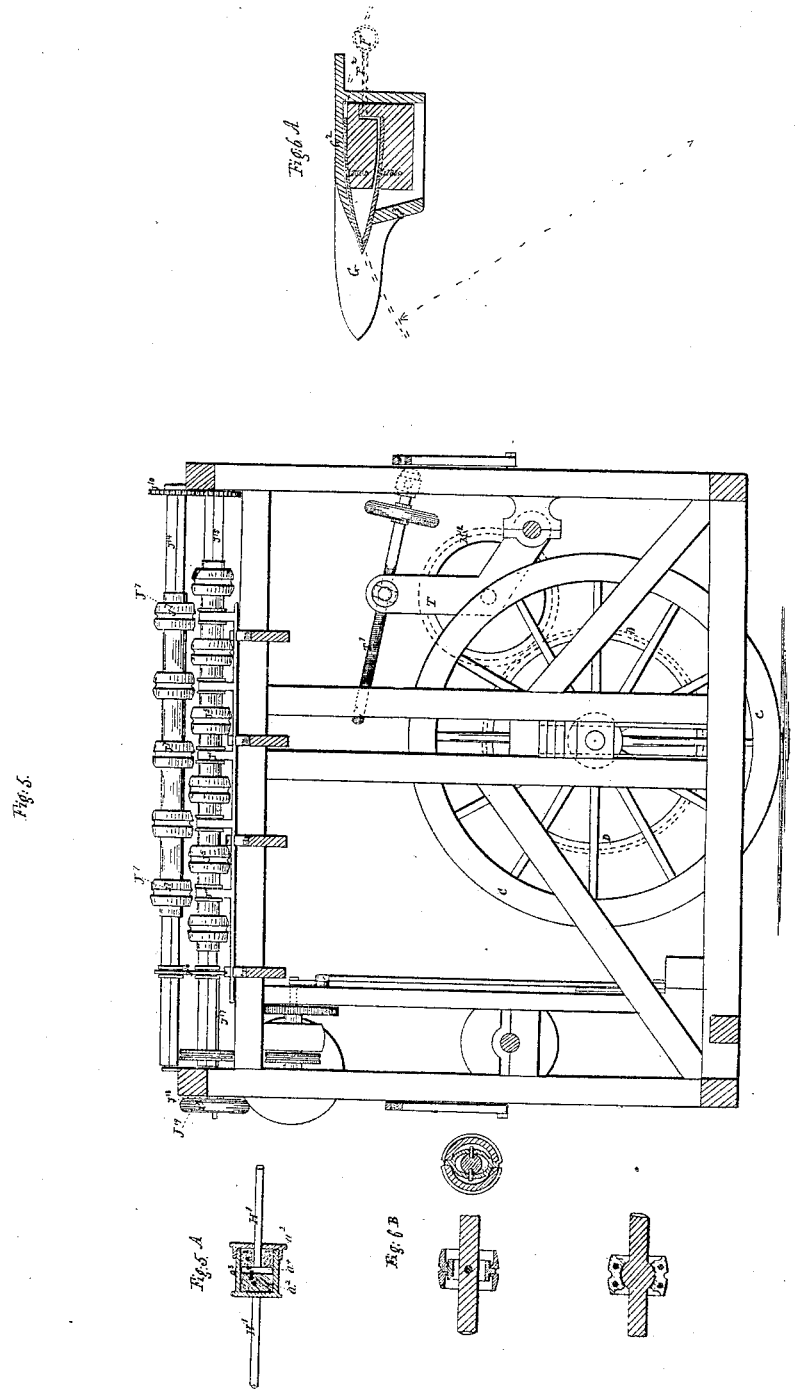

14 Sheets—Sheet 6.

P. H. WATSON & E. S. RENWICK.
Harvester and Binder.

No. 9,930.

Patented Dec. 6, 1853.

14 Sheets—Sheet 7.
P. H. WATSON & E. S. RENWICK.
Harvester and Binder.
No. 9,930. Patented Dec. 6, 1853.
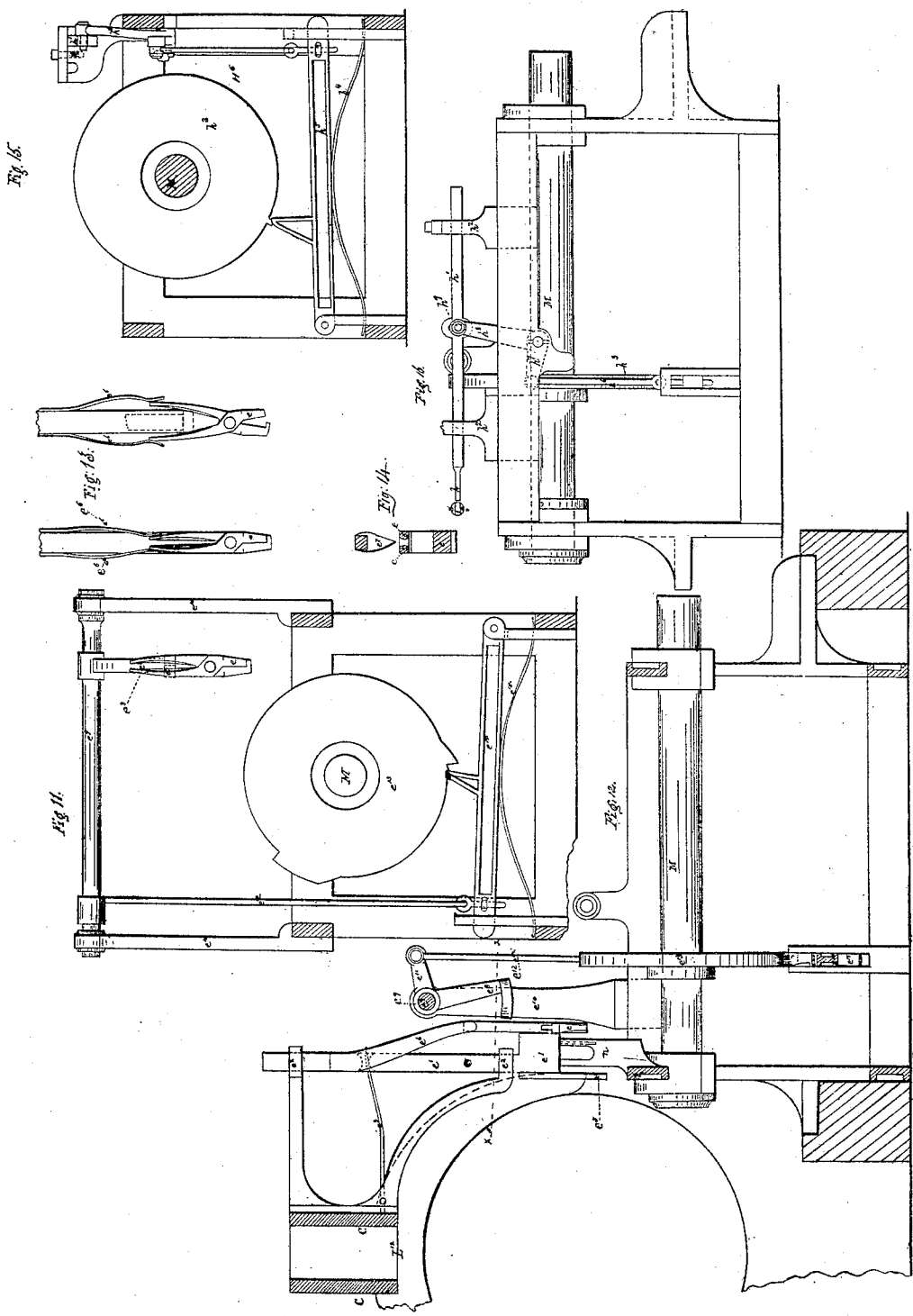

14 Sheets—Sheet 8.
P. H. WATSON & E. S. RENWICK.
Harvester and Binder.
No. 9,930. Patented Dec. 6, 1853.
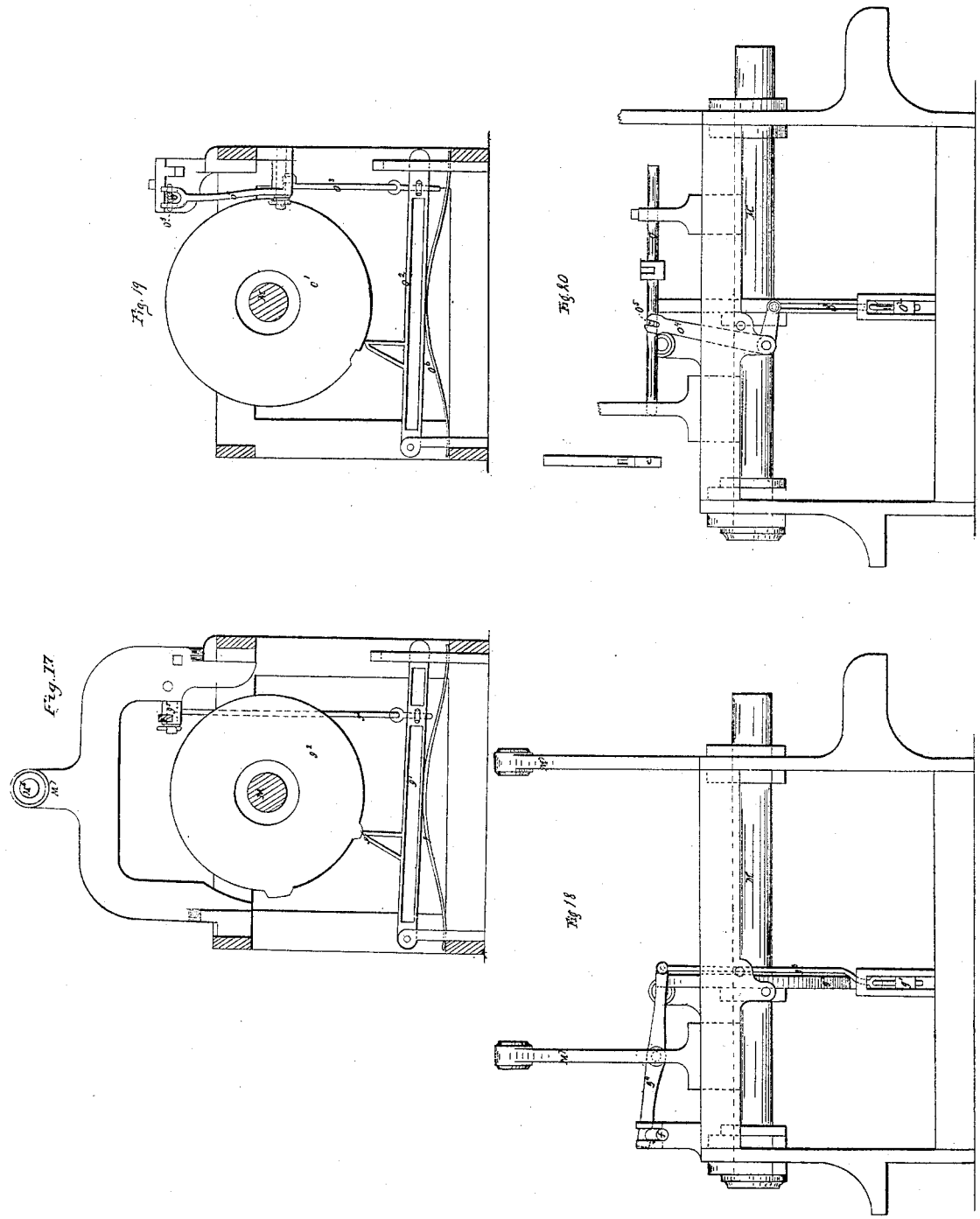

14 Sheets—Sheet 9.
P. H. WATSON & E. S. RENWICK.
Harvester and Binder.
No. 9,930. Patented Dec. 6, 1853.
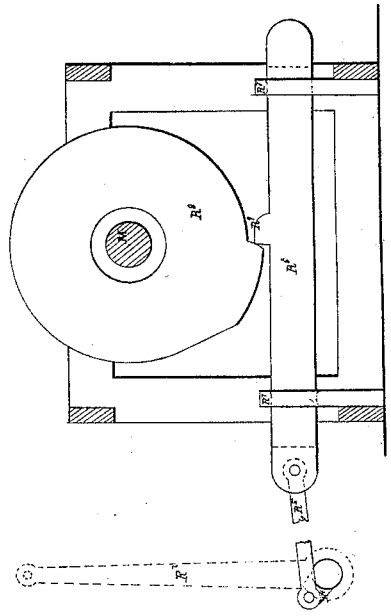
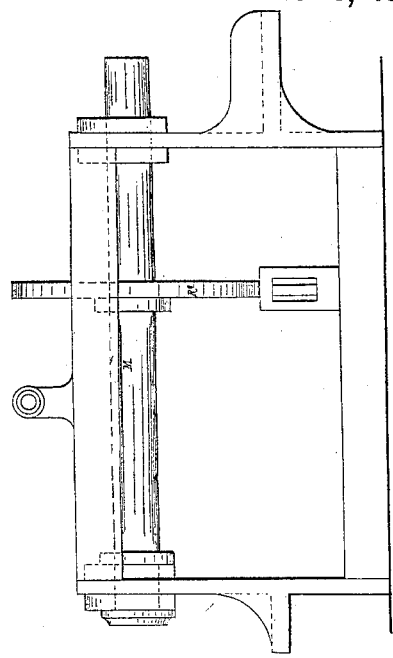
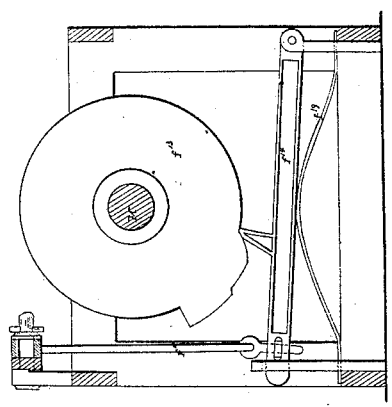
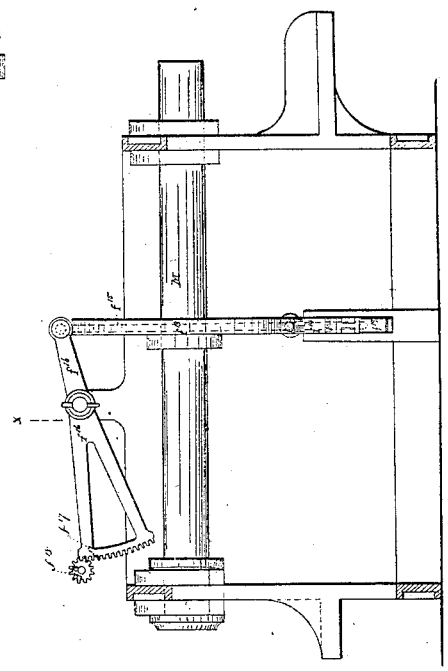

14 Sheets—Sheet 10.
P. H. WATSON & E. S. RENWICK.
Harvester and Binder.
No. 9,930. Patented Dec. 6, 1853.
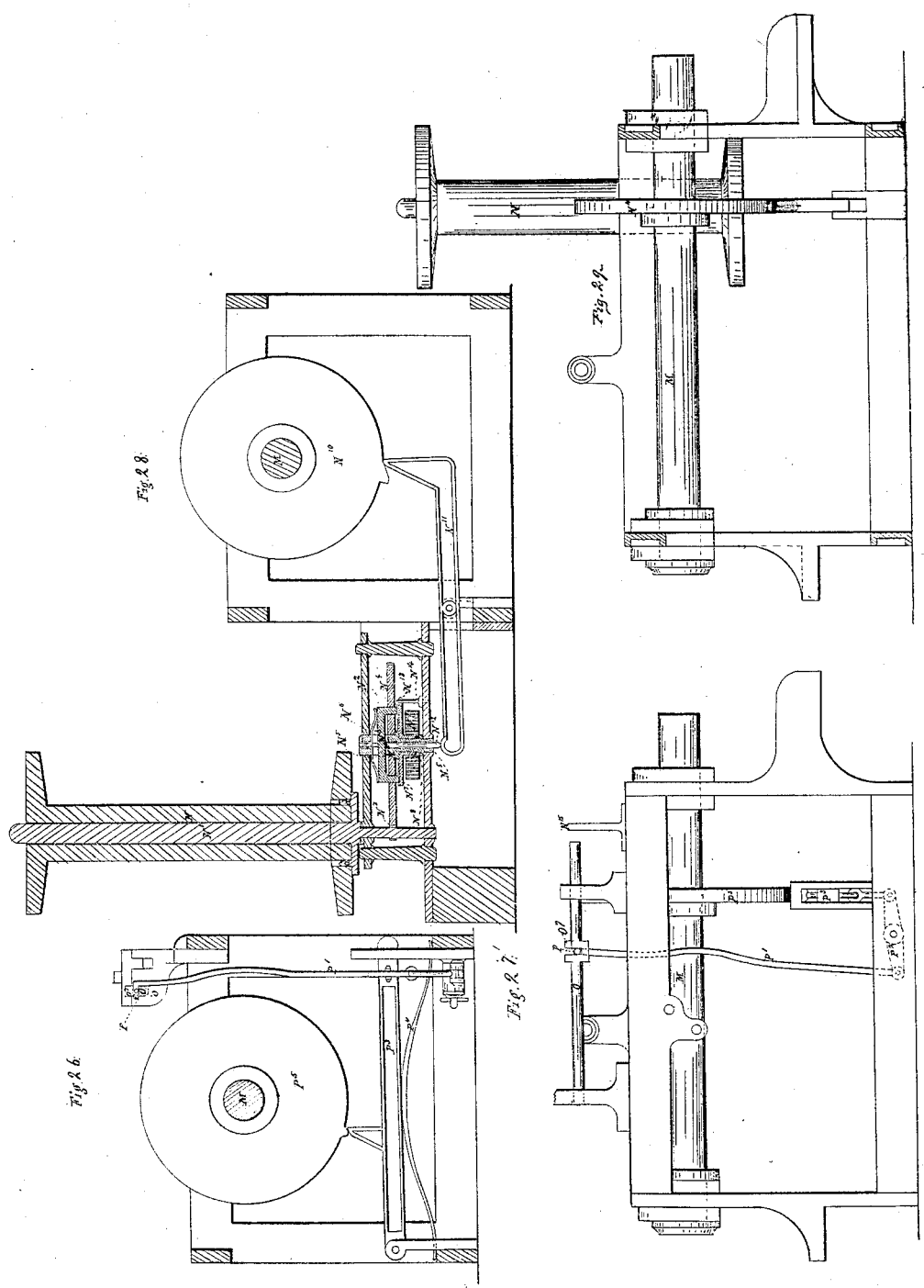

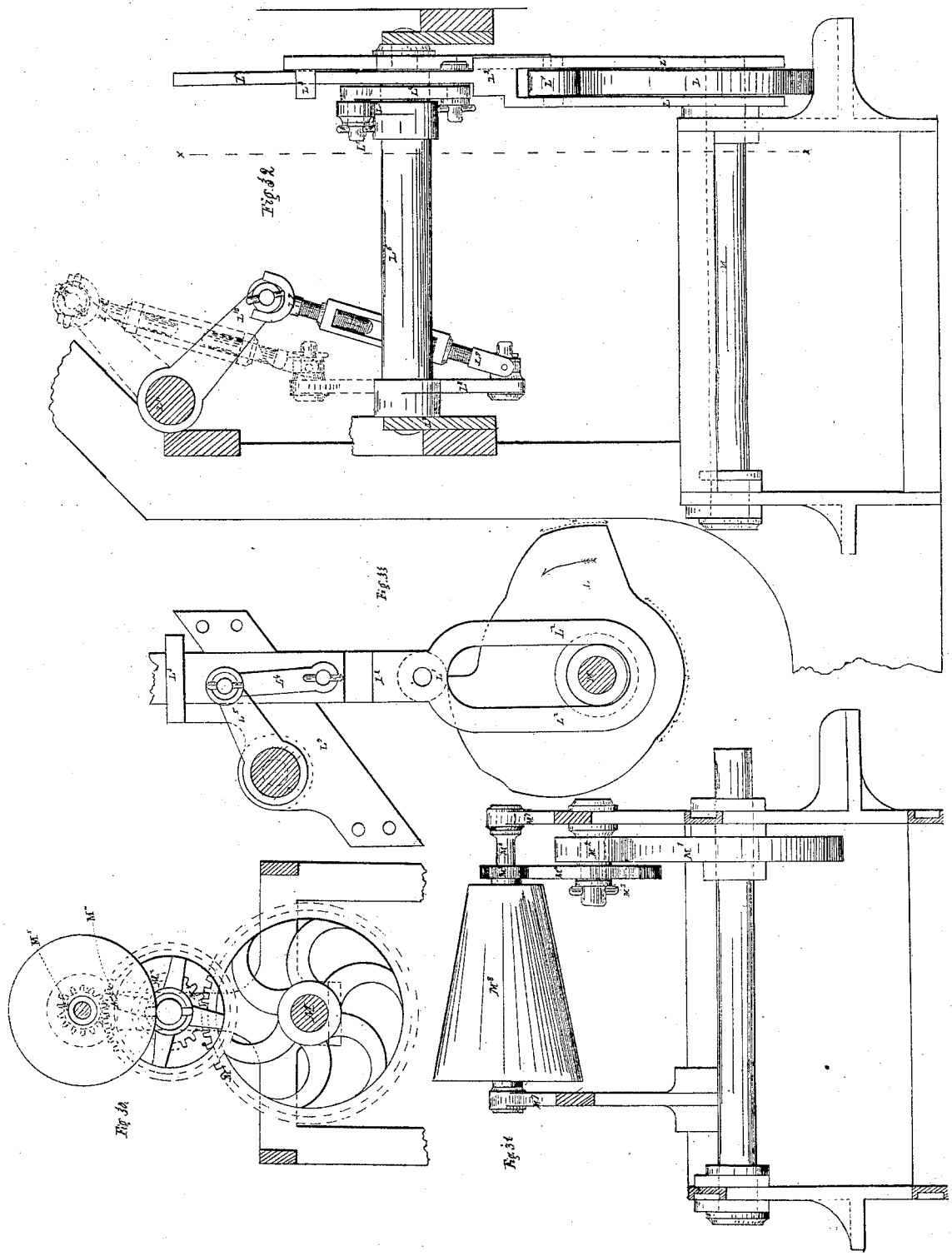

14 Sheets—Sheet 12.
P. H. WATSON & E. S. RENWICK.
Harvester and Binder.
No. 9,930. Patented Dec. 6, 1853.
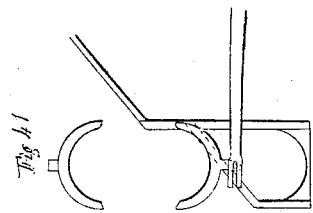
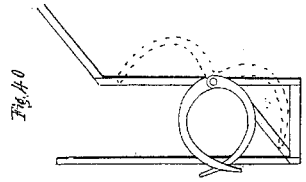
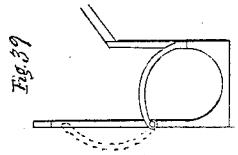
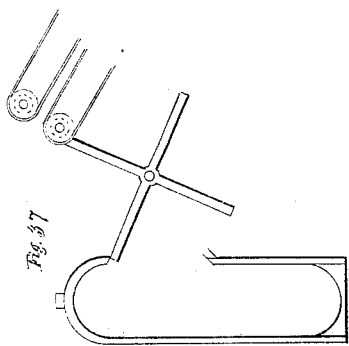
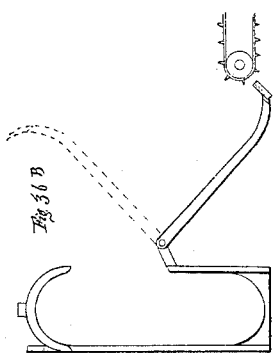
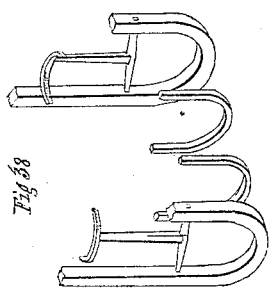
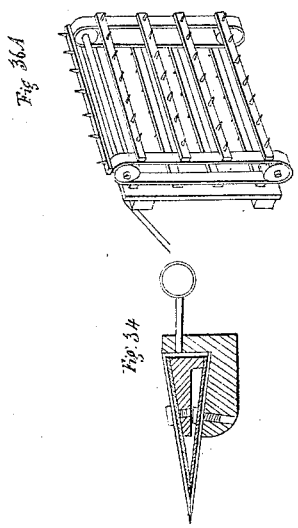
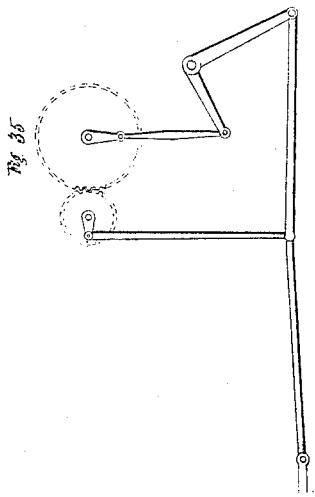
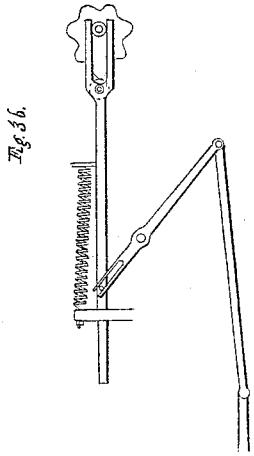

14 Sheets—Sheet 13.
P. H. WATSON & E. S. RENWICK.
Harvester and Binder.
No. 9,930.
Patented Dec. 6, 1853.
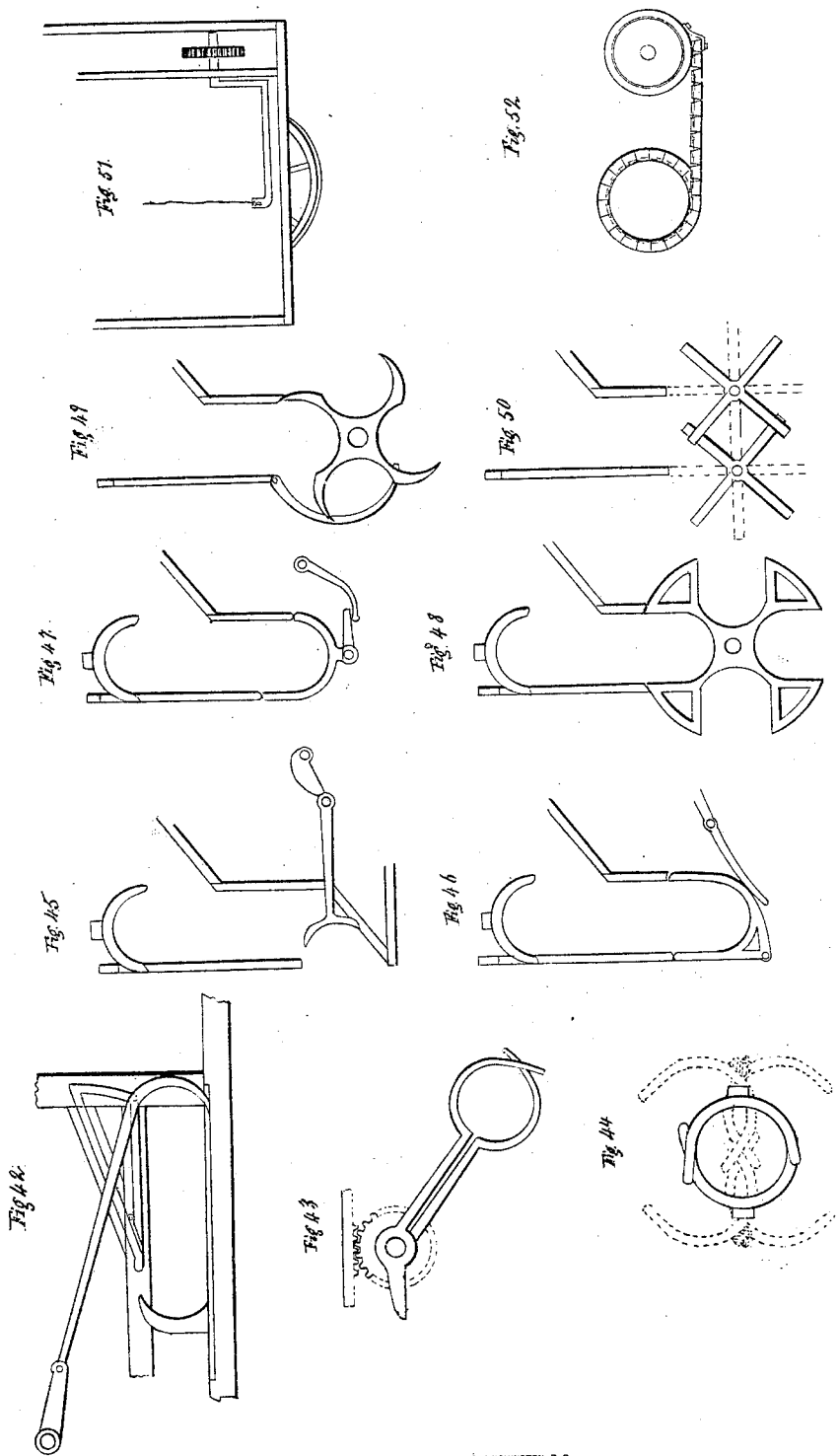

14 Sheets—Sheet 14.
P. H. WATSON & E. S. RENWICK.
Harvester and Binder.
No. 9,930. Patented Dec. 6, 1853.
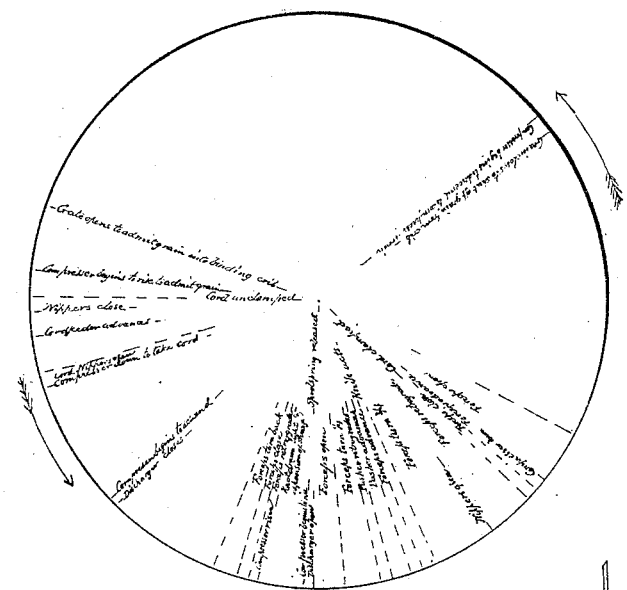
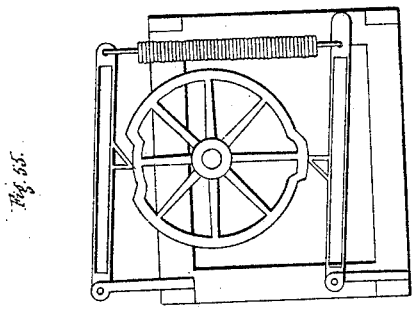
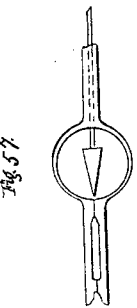
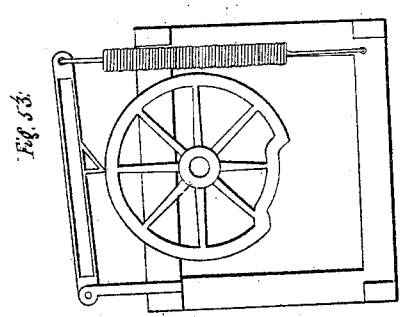
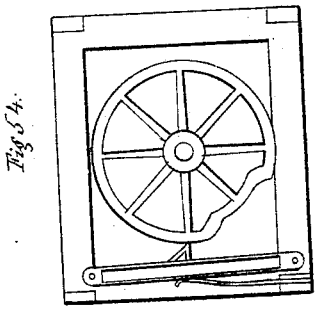

UNITED STATES PATENT OFFICE.

PETER H. WATSON AND EDWARD S. RENWICK, OF WASHINGTON, D. C.

IMPROVEMENT IN GRAIN HARVESTERS AND BINDERS.

Specification forming part of Letters Patent No. 9,930, dated December 6, 1853; antedated June 6, 1853.

*To all whom it may concern:*

Be it known that we, PETER H. WATSON and EDWARD S. RENWICK, of Washington, in the District of Columbia, have invented certain new and useful Improvements in Harvesting Machines, of which the following is a full, clear, and exact description, reference being had to the accompanying drawings, which make part of this specification, and in which—

Figure 1:
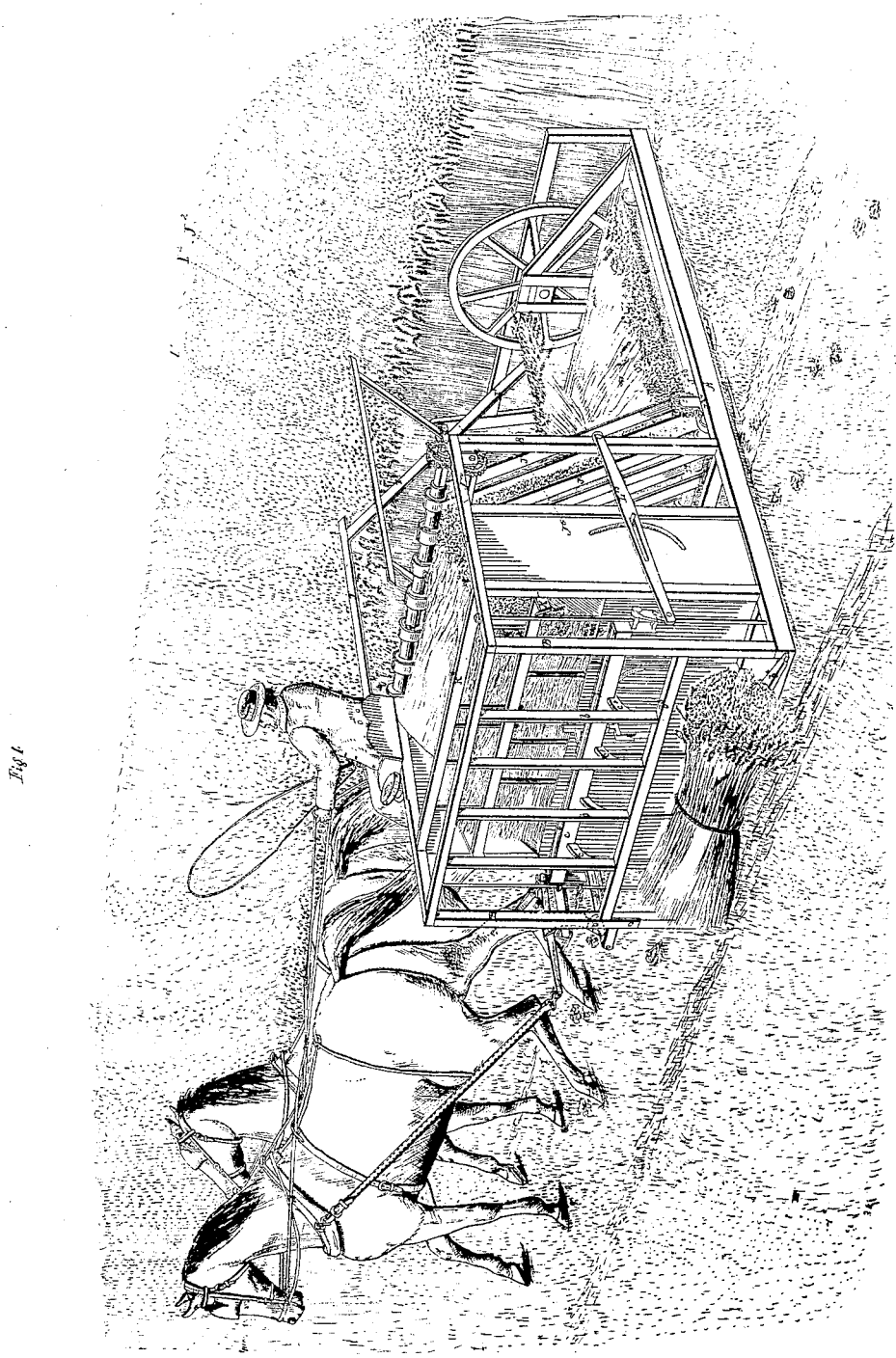
Figure 9:
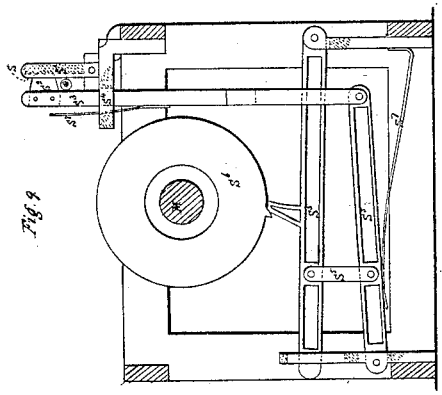
Figure 10:
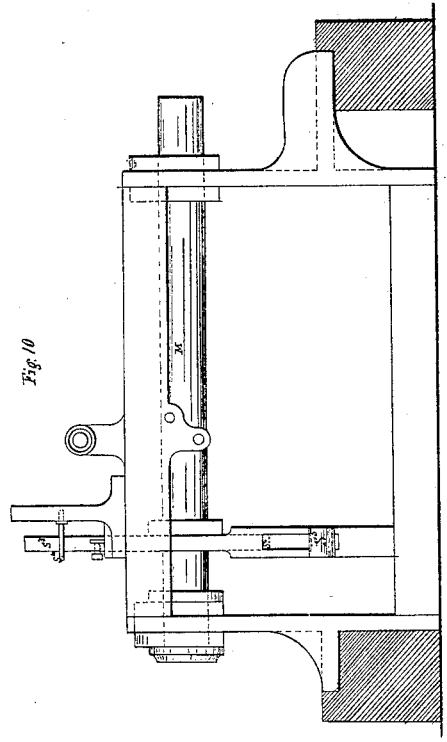
Figure 8:
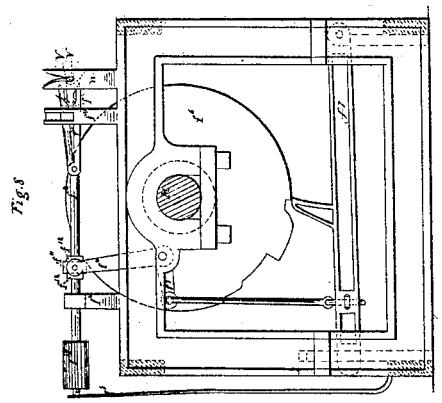
Figure 7:
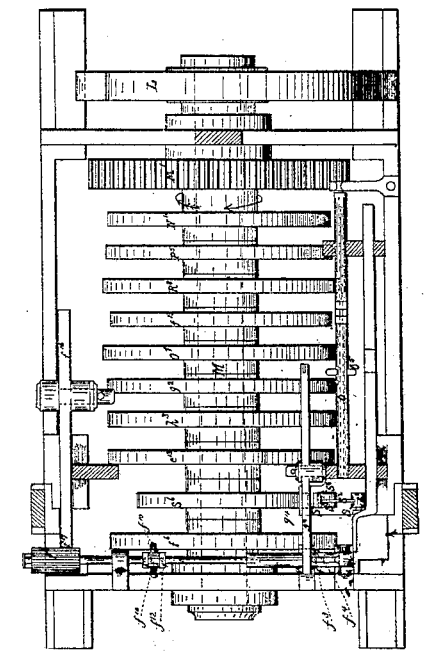

Figure 1 represents a view in perspective of one modification of our machine as arranged for cutting grain and binding the same into sheaves. Fig. 2 is a plan of the same. Fig. 3 is a vertical longitudinal section of the machine at the line $x\,x$ of Fig. 2, looking toward the front of the machine. Fig. 4 is an elevation of the left end of the machine, or that farthest from the standing grain when the machine is in operation. Fig. 5 is a vertical transverse section at the line * * of Fig. 2, looking toward the right end of the machine, or that next the standing grain. Fig. 6$^A$ is a transverse section of the sickle on an enlarged scale. Fig. 7 is a top view of the forceps and other instruments which act upon the cord and of the cams upon their shaft, all mounted in the frame of the binding mechanism. Fig. 8 is an elevation of the tying-forceps and of the cam, &c., by which they are operated. Fig. 9 is a cross-section, and Fig. 10 is a side elevation, of a portion of the binding mechanism, showing the knife for severing the binding-cord and the mechanism for actuating the same. Fig. 11 is a cross-section of a portion of the binding mechanism, showing the cord-nippers and the mechanism for opening the same. Fig. 12 is a longitudinal section of a portion of the binding mechanism and of the compressor, showing a view of the cord-nippers, and the mechanism for actuating them, at right angles to the view shown in Fig. 11. Fig. 13 is a face view of the nippers, showing the manner in which the springs act upon the shanks to close the jaws. Fig. 14 is a horizontal section at the line $x\,x$ of Fig. 12, showing the relative position of the wedge for entering between the shanks of the nippers to open the jaws thereof, the shanks of the nippers, and the nipper-stock. Fig. 15 is a cross-section of a portion of the binding mechanism, showing the finger for pushing the ends of the cord through the loop in tying the knot and the mechanism for operating the same. Fig. 16 is a side view of the same at right angles to that shown in Fig. 15. Fig. 17 is a cross-section of a portion of the binding mechanism, showing the lever for closing the tying-forceps and the mechanism by which the same is operated. Fig. 18 is a side view of the same at right angles to that shown in Fig. 17. Fig. 19 is a cross-section of a portion of the binding mechanism, showing the cord-feeder and the mechanism by which it is operated. Fig. 20 is a side view of the same at right angles to that shown in Fig. 17, showing also the cord-nippers in their proper relative position. Fig. 21 is a longitudinal section of a portion of the binding mechanism, showing the device for turning the tying-forceps. Fig. 22 is a cross-section of the same at the line $x\,x$ of Fig. 21. Fig. 23 is a cross-section of a portion of the binding mechanism, showing a portion of the mechanism for actuating the discharging-gate. Fig. 24 is a side elevation of the same, showing a view of the parts at right angles to that represented in Fig. 23. Fig. 25 is an elevation of the rock-shaft and its arms, which form parts of the mechanism for transmitting motion from the cam to the discharging-gate. Fig. 26 is a cross-section of a portion of the binding mechanism, showing the clamp of the cord-feeder and the mechanism by which it is actuated. Fig. 27 is a side elevation of the same, showing a view of the parts at right angles to that represented in Fig 26. Fig. 28 is a cross-section of a portion of the binding mechanism, of the spool for the binding-cord, and of the mechanism by which it is actuated. Fig. 29 is a vertical longitudinal section of the same, showing a view of the parts at right angles to that represented in Fig. 28. Fig. 30 is a cross-section of a portion of the binding mechanism, showing the gearing of the cam-shaft. Fig. 31 is a longitudinal section of the same, showing a view at right angles to that represented in Fig. 30. Fig. 32 is a side view of a portion of the frame of the binding mechanism and of a part of the device for actuating the compressor. Fig. 33 is a cross-section of the same at the line $x\,x$ of Fig. 32.

The drawings from Figs. 8 to 33 included are on an enlarged scale, say about one-half the linear dimensions of a working-machine. Figs. 34 to 57 represent various modifications of the machine, which will be more particularly described hereinafter.

In order that the nature of our invention may be the better understood, we will proceed to give a general description of our harvesting and binding machine, before describing its several parts in detail.

The machine consists principally of a broad platform, supported at a few inches above the ground by a pair of wheels. On the front edge of the platform a knife or sickle for cutting the grain is placed, and on one end of it is mounted an apparatus for binding the grain into sheaves, while the rest of its upper surface is traversed by rakes for gathering the cut grain preparatory to binding. Above and a little in advance of the front edge of the platform is a revolving reel, which has four vanes, that in succession press the grain against the sickle, and turn it onto the platform after being cut. The machine is drawn forward by horses, which are harnessed to a tongue which projects from the front of that portion of the platform occupied by the binding apparatus. One of the carrying-wheels actuates the gearing, which gives motion to the cutting, gathering, and binding mechanism. As the machine is drawn forward the vibrating cutter on the front edge of the platform is pressed against the stalks of the grain, and cuts them off, when they are turned back by the reel upon the rake. The latter conveys them to the binding apparatus, where, as soon as a sufficient quantity has accumulated to form a sheaf, it is compressed into a compact bundle by mechanical arms, and encircled with a band, after which the ends of the band are knotted together by mechanical fingers. This operation completes the binding of the sheaf, which is then dropped at the side of the machine, when the latter immediately proceeds to form another sheaf.

Our improvements may be conveniently arranged under several heads, which relate to different parts of the machine. Some of these improvements are applicable to the mowing of grass, as well as to the harvesting of grain, and many of them may be applied with advantage to mowing and harvesting machines already in use.

The first part of our invention consists of a sickle furrowed transversely on one side from edge to edge, so that by beveling off the front edge of the opposite or smooth side by grinding, or otherwise, a serrated cutting-edge is produced, which, when worn smooth, can be continually reproduced by grinding until the blade is worn out.

The second part of our invention consists in making the knife or sickle of two parallel blades in such manner that their edges shall meet and form a single doubly-serrated cutting-edge, so that if one part of the double blade is moved faster than the other, or in a different direction, or if one is stationary and the other is moved, a divided edge will be produced, which in its operation will combine the action of both the knife and shears.

The third part of our invention relates to the movement of the knife, and consists in imparting to it a compound reciprocating motion, so that its motion in either direction is effected by a series of short jumps, by which motion its cutting action is improved and its liability to clog diminished.

The fourth part of our invention has for its object the lessening of the vibrations which are always produced in thin sickle-blades by a rapid reciprocating movement, and which tend to increase the friction of the sickle and to cause its teeth to strip off when brought in contact with any hard substance that may by accident be found among the standing grain. This branch of our invention consists in connecting the sickle-blade with the mechanism by which it is operated by means of an elastic connecting-rod, which expands and contracts under the strain produced by sudden changes in the direction of the movement of the knife.

The fifth part of our invention consists of a shield-plate, which overlies the blade and extends nearly to its cutting-edge, to prevent the stalks of the severed grain from resting upon the blade after being cut and while falling over upon the platform.

The sixth part of our invention has for its object the protection of the blade from injury by the pulling action of the stubble, and also to steady the stalks while being cut off; and this part of our invention consists in placing a bar, smooth or serrated, which we call the stubble-guard, beneath the front edge of the knife.

The seventh part of our invention consists in arranging the knife in such manner that its cutting edge can be kept at the proper distance in advance of the stubble-guard or the shield, whether it be new and broad or worn and narrow.

The eighth part of our invention consists in a method of moistening the knife while the machine is in motion, to prevent its clogging or gumming, and thus facilitate the cutting of the grain.

The ninth part of our invention has reference to the raking of the cut grain and to its delivery to the binding apparatus; and it consists in raking the grain continuously by the operation of endless bands or otherwise while the binding is performed at intervals, the two operations being thus independent of each other, whereby the mechanism of a compound reaper and binder is simplified, while at the same time the rate at which the binder works can be varied according to the state of the crop without affecting the operation of the binding apparatus.

The tenth part of our invention consists in the method of obtaining the requisite space for compressing the grain into a sheaf, and binding the same, without increasing the horizontal area of the machine, by conveying the grain upward from the raker to an elevated platform, where it is transferred to the binder.

The eleventh part of our invention has reference to the binding of grain of different lengths into sheaves, without changing the relative positions of the cutting and binding apparatus; and it consists in conveying the cut grain from the cutting to the binding apparatus by means of a series of shifting endless bands or their equivalents, arranged in such manner that without stopping the machine they can be adjusted to present the grain to the binder in such a position that the band will be passed round the middle of the sheaf, whether the latter be long or short, whereby the machine is rendered more rigid, as the cutting and binding mechanism can both be permanently secured to the frame.

The twelfth part of our invention consists of a device for conveying the grain from the rake to the binder, which is composed of two parallel series of endless bands, the bands of one series being arranged with teeth which receive the grain between them, where it is securely held by the bands of the other series while being conveyed, without being subjected to such a degree of pressure as to endanger its thrashing.

The object of the thirteenth part of our invention is to provide a method of compensating for the alternate stretch and contraction of the conveyers, which results from alternate moistening and drying, by working grain wet with dew in the morning, and dry grain in the middle of the day; and it consists in pressing apart the belt-rollers by springs, which will yield to the contraction of the belts, and expand again to tighten the belts when they stretch.

The fourteenth part of our invention relates to the discharge of the grain from the conveyer; and it consists of a stripper or comb, which works in connection with the endless bands so as to insure the delivery of the grain therefrom.

The fifteenth part of our invention relates to the reception of the grain from the conveyer while a sufficient quantity to form a sheaf is accumulating, and to the discharge of the accumulated grain into the binder to be bound when a proper quantity has been gathered to form a sheaf of the required size; and it consists of a gate working in connection with the platform, and opened and closed at proper intervals to discharge the gathered grain into the binder, and to stop the discharge until another like quantity has accumulated to form another sheaf.

The sixteenth part of our invention has reference to the apparatus by which the cord is caused to encircle the sheaf, and is brought into the proper position to be tied. This part of our invention consists in causing the nippers to traverse with the apparatus for squeezing or compressing the sheaf, while the cord-feeder has merely enough movement imparted to it to enable it to deliver the extremity of the cord to the traveling nippers, and to move out of the way of the tying mechanism.

The seventeenth part of our invention relates to the delivery of the cord from the spool to the tying mechanism; and it consists of a clamp whose action is regulated by a cam acting in combination with the cord-feeder for the purpose of preventing the movement of the cord therein during certain parts of the operation of forming the sheaf.

The eighteenth part of our invention relates to the adjustment of the tension of the binding-cord according to the degree of its rigidity, or the tightness with which it is desirable or necessary to draw it round the sheaf; and this part of our invention consists in the combination of an adjustable stop with the barrel of the tension-spring, which admits of the latter being set to act with more or less force, as may be required.

The nineteenth part of our invention relates to the operation of tying the knot; and it consists in giving to the tying-forceps a longitudinal traversing movement, first backward to allow the two ends of the band to be laid together preparatory to tying, and then forward to seize the two ends thus laid together to tie them.

The twentieth part of our invention also relates to tying the knot; and it consists of a pronged or forked standard placed within the range of the tying-forceps, and acting in connection with them, the pushing-rod, the cord-feeder, and the traveling cord-nippers, to assist in steadying and tying the cord.

The twenty-first part of our invention relates also to the tying of the knot, and to the compression of the sheaf; and it consists in giving to the compressor a double movement, or a descent in two steps, the first step to reduce the sheaf very nearly to the required dimensions and to encircle it with the cord, and the second step of the descent to complete the compression of the sheaf or to reduce its size sufficiently to leave the cord slack enough to be twisted and drawn into a loop by the tying-forceps in the process of making the knot.

The twenty-second part of our invention also relates to the operation of tying the knot; and it consists in mounting the cord-nippers upon a sliding spring-stock, or the equivalent thereof, in such manner that the nippers will descend with the loose end of the cord to encircle the sheaf before the compressor reaches its lowermost limit, the spring afterward yielding to allow the compressor to complete its descent.

The twenty-third part of our invention also relates to the operation of tying the knot; and it consists of a brake applied to the cord at some point between the place at which the knot is tied and the extremities of the band, to insure the stretching of the ends of the cord across the loop preparatory to their projection through it.

The twenty-fourth part of our invention consists of an apparatus for discharging the sheaf by depressing sections of the ribs which form the crib in which the sheaf is compressed and bound, which depressed sections are raised after the sheaf has been delivered from the machine.

The last part of our invention has reference to the relative positions of the cutting and binding apparatus; and it consists in arranging the two upon the opposite sides of the driving-wheel in such manner that the weight of the cutting apparatus is counterbalanced to a great extent by that of the binder, and the proportion of the weight on the driver is increased, whereby it is caused to adhere to the ground with greater force, which insures its turning, whereby also the motion of the mechanism is rendered more regular, and the center of draft of the machine is maintained more nearly in the middle of the path in which the horses walk, while at the same time increased space is obtained for the binding apparatus, which in this arrangement occupies the unappropriated space generally found in reaping-machines behind the horses.

In the accompanying drawings, A is the framed platform or carriage of the machine, which is supported above the ground upon two wheels, C C'. Each of these wheels is fitted with a separate axle, whose journals revolve in separate boxes, which slide vertically in suitable standards, forming part of the carriage-frame, so that the latter may be set to run at a greater or less distance above the surface of the ground, as may be required.

The mechanism for binding the grain, and for imparting motion to the several acting members of the machine, is supported in a frame, B, at one extremity of the carriage, and is driven from one of the running-wheels, C, whose axle is fitted with a cog-wheel, D, from which the motion is taken.

The front of the binding-frame has a tongue, E, projecting from it, to which the horses are attached in the usual manner. The cross-bar E' of this tongue is hinged to the frame, and the tongue itself is connected, by an adjustable brace, E², with the upper front rail of the binding-frame B. The lower extremity of this brace is pivoted to the tongue. Its upper extremity has a screw cut upon it, which passes into a nut, E⁴, supported by a bracket upon the front rail of the frame, and this nut is fitted with a hand-wheel, E⁴, so that it may be turned to screw the rod up or down, and thus cause the machine to turn upon the axles of the running-wheels, as fulcra to raise or depress the front rail of the carriage and the cutter thereto attached.

That portion of the carriage between the running-wheels is fitted at its front with the cutting apparatus. This consists of a series of stationary fingers, G, which are secured to the front rail, G', and of a reciprocating sickle or knife, H, which is caused to move to and fro in transverse slots formed in the bases of the fingers. The knife is of peculiar construction. It is composed of two blades, the lower of which, in this instance, is stationary, while the upper is moved to and fro over the lower. Each blade is formed of a curved plate of steel, whose convex surface is furrowed, and whose concave surface is beveled at its front edge to form an acute angle with the convex furrowed surface, thus forming a serrated cutting-edge. Curved knives of this construction may be conveniently formed by cutting a screw upon the surface of a steel tube, (the curvature of which corresponds with that of the knives to be formed,) and then by slitting the tube longitudinally into staves of the proper breadth to form a blade. Each knife-blade is secured to a stock, and that of the upper or movable knife is connected at the extremity nearer the driving wheel with the lower arm of an elbow-lever, H², by means of a connecting-rod, H'. This elbow-lever is pivoted at the intersection of its arms to an arm, H³', which depends from a short rock-shaft, H³, supported in suitable boxes upon the frame of the machine. This rock-shaft is fitted with a second arm, H⁴, whose extremity is connected, by a rod, H⁵, with a crank, H⁶, secured to a shaft, H⁷, that has a continuous rotary movement imparted to it, so that the rock-shaft H³ with its arms is caused to vibrate or rock. The horizontal arm of the elbow-lever H² is also connected, by a rod, H⁸, with a crank, H⁹, which is secured to a crank-shaft, H¹⁰, parallel with that first mentioned. The second crank-shaft, H¹⁰, is caused to revolve from the first, H⁷, but at a greater speed, by means of a cog-wheel and pinion, H¹¹ and H¹², so that the elbow-lever H² driven by it is caused to vibrate much more rapidly than the arm H³, to which it is pivoted. It results from this arrangement that the movable sickle-blade is caused to move to and fro in a succession of short jumping strokes, which overlap each other, by which means a fast cutting motion of short range is imparted to the blade, while at the same time the portions of the blade moving in this manner are brought in continually new positions with respect to the lower stationary blade and sickle-fingers, whereby an equality of wear is insured and the self-clearing of the knives is promoted.

A rapid vibratory movement is always attended with the jar produced in overcoming the momentum of the mass moved each time the direction of the movement is reversed. In order to diminish this jar and the injurious effects resulting from it to the machinery, the connecting-rod H', by which the sickle-blade is connected with the elbow-lever, is made elastic. This is effected by forming it of two sections, one of which, as shown in Fig. 5 A terminates in a disk, $a^4$, which is received between two springs of vulcanized india-rubber, $a^2$, contained in a tubular spring-box, $a^3$, secured to the adjacent extremity of the other section. The head of this spring-box is perforated to permit the free movement of the section of the rod to which the disk $a^4$ is secured, so that the latter is maintained in a central position in the spring-box solely by the elasticity of the springs. From this method of construction it is obvious that the momentum of the moving blade at each change in the direction of its motion is deadened by the springs, which lessen the jar and render it practically inappreciable.

The beveled edges of the two knife-blades bear upon each other, as shown in the drawings at Fig. 6^A, which represents a section of a cutting apparatus; hence the wearing away of the beveled edges by mutual attrition will cause them to sharpen each other, and as the beveled faces of the blades are ground away the serration of the edges is continually renewed by bringing into use new portions of the exterior furrowed surfaces. The cutting action of the instrument thus formed is that of the shears and knife combined. It resembles the former instrument in the shearing action produced by the movement of the serrated edge of one blade over that of the other, and it resembles a knife in the acute edge it presents to the standing grain. As the front edges of the blades are worn away by use, the blades are set forward upon their stocks, and provision is made for this operation by passing the bolts which connect the blades with their stocks through transverse slots in the former.

In order to prevent the gumming of the knife, and at the same time to facilitate its cutting action, it is kept continually moistened with water, so that the grain, even at midday, is cut with the same facility as when it is covered with the dew of the morning. This moistening is effected in the present machine by means of a reservoir, F, and a distributing-pipe, F', that extends the whole length of the cutting apparatus. The reservoir is situated on that part of the carriage behind the horses where it can be conveniently replenished. The distributing-pipe F' extends laterally from the reservoir, and is fitted with a series of small branch pipes, $F^2$, which deliver the water between the two knife-stocks of the compound blade, whence it works forward and escapes between their cutting-edges. The distributing-pipe is fitted at the reservoir F with a valve or stop-cock, $F^3$, to regulate the supply of water, and a flange on the back of the lower knife-stock is extended upward behind the upper one to prevent the escape of water in a backward direction. The water supplied not only facilitates the cutting action of the knife, but also acts as a lubricator to reduce its friction in moving to and fro.

The fingers G, which support the knife and prevent the escape of the grain in a lateral direction while the knife is acting upon it, are conveniently formed of cast metal, and are attached by their bases to the front rail or cutter-bar, G', of the machine. These fingers, as shown at Fig. 6^A, have two shields, the one, $G^2$, of which extends over the knife or sickle nearly to the cutting-edge thereof, and thus protects its upper surface from the butts of the falling grain, which would otherwise, by bearing on the sickle, not only engender a considerable amount of friction, but would themselves be moved laterally by the quick movement of the sickle, and thus fall in confusion upon the platform behind. The other shield, $G^3$, projects downward in nearly a vertical direction from the cutting-edge of the sickle, and protects its lower surface from the stubble left in cutting the grain, and which would otherwise bear against the lower surface of the sickle, and tend to drag it downward as the machine is moved forward over the stubble. The lower guard may be grooved or serrated on its front side to help to hold the straw firmly under the action of the sickle.

The standing grain is pressed upon the edge of the sickle by a revolving reel composed of a series of bars, I, which are secured to arms I', projecting from a shaft, $I^2$. This shaft is caused to revolve as indicated by the arrows in Fig. 2.

The platform upon which the cut grain is received is traversed by a raking apparatus, whose office is to gather the grain toward the binding apparatus. This raker consists of a series of endless bands, J, which are supported upon rollers J' $J^2$, situated at the opposite extremities of the platform. The upper portions of these bands, upon which the cut grain falls, are moved by the turning of the roller $J^2$ nearer the binding apparatus, toward the side of the machine on which the latter is mounted; while the lower portions of the bands return in the opposite direction to the opposite extremity of the platform. The bands thus collect the grain as it falls and rake or gather it toward the binding apparatus, and this process proceeds continually, for the bands are caused, by the continuous rotation of the roller $J^2$, to move in a regular and continuous manner.

The raking-platform is situated at one side of the driving-wheel, and the binding apparatus is situated at the opposite side thereof. The two thus counterbalance each other's weight to a considerable extent, and as the driving-wheel is situated between them, it is pressed upon the ground by a large preponderance of the whole weight of the machine. This arrangement is attended with two important advantages: In the first place, the mean line of draft is brought in line, or nearly so, with the tongue, and hence the carriage does not tend to move obliquely; in the second place, a great weight is thrown upon the driving-wheel, which is thus prevented from slipping, thereby insuring its rolling upon the ground.

In order to convey the raked grain from the platform to the binder and to elevate it sufficiently to permit of the vertical compression of the grain in forming a sheaf, a conveyer is provided, which not only effects these purposes, but also regulates the position on the sheaf of the cord or band by which it is bound.

This conveyer consists of two series of endless bands, which act in connection. Those, $J^3$, of one series are passed round a roller, $J^4$, parallel with and adjacent to the roller $J^2$ of the raking-bands, while their upper extremities are supported and put in motion by a second roller, $J^5$, situated near the top of the binder-frame. The bands $J^6$ of the other series are passed around an upper roller, $J^7$, and a lower roller, $J^8$, corresponding in their relative positions with those of the first series. As each series is composed of narrow bands, those of one series are arranged opposite the spaces between those of the other, and the bands of the lower series are arranged to work in the spaces between those which effect the raking, so that no space is left for grain to drop in passing from the raking-bands to those of the conveyer.

In order that the grain may not slide on the lower bands of the conveyer, they are studded with teeth, $J^{13}$, between which the grain is received, and it is prevented from escaping from between the teeth by the upper bands, which ride upon it and hold it in place. In order that the grain may not be rubbed, and thus partially thrashed, by the moving of one apron at faster speed than the other, the two are passed over rollers of the same diameter whose axles are connected with equal cog-wheels $J^9$ $J^{10}$, which gear into each other.

As the grain arrives at the upper extremities of the conveyer, it is stripped therefrom and delivered upon an elevated platform, whence it descends to the binding apparatus. This stripping is effected by a series of fingers, $J^{11}$, whose outer extremities bear upon portions of the roller of the lower bands, which are of less diameter than those portions thereof on which the bands are supported. The opposite or inner extremities of these stripping-fingers are attached to a bar, $J^{12}$, which is supported in notches formed in the adjacent extremities of the inclined ribs B', which constitute the elevated platform above mentioned.

In the machine we are describing the binding apparatus is fixed to the carriage, and the sickle or cutting apparatus is also fixed thereto; hence, if no provision were made for the purpose, the stalks of grain, whether long or short, would always be bound at the same distance from their butts. Grain, even in the same field, varies considerably in the length of its stalks, and it is desirable that the sheaves should be bound near about the middle of their length. In order to effect this result in a machine like the present, in which the sickle and binder are not made adjustable with respect to each other, the conveyer is constructed in such manner that it delivers the grain upon the elevated platform B' with the middles of the stalks in a proper position for receiving the binding-band, and that, too, whether the grain cut be long or short, within certain limits. This is effected by shifting laterally the upper extremities of the conveyer-bands, while the lower extremities maintain always the same relative positions with respect to the raker. This lateral shifting of the bands in the machine we are describing is effected by making the upper rollers, $J^5$ $J^7$, tubular and mounting them upon shafts $J^{14}$ $J^{15}$, upon which they can slide endwise. In order to move them simultaneously upon their shafts, each roller is grooved to receive the forked extremity of a shifting-fork, $J^{16}$, which can be moved to shift the rollers by means of a screw-rod, $J^{17}$, and nut $J^{18}$. The latter is fitted with a hand-wheel, $J^{19}$, which is within reach of the driver, so that he can turn the nut to shift the positions of the aprons, and thus regulate the position of the binding-band upon the sheaf.

As the conveyer-bands are shifted in one direction or the other, it is essential to the perfect action of the machine that the stripping-fingers should shift with them. This shifting of the fingers is effected by connecting the stock or rod $J^{12}$, from which they project, with the shifting-fork $J^{16}$, so that the fingers are forced to move simultaneously with the bands. As the bands which form the conveyer, when forced to run obliquely, would naturally tend to work endwise upon their rollers, each one has a cord attached to its inner side, which is received in corresponding grooves formed in the peripheries of the upper and lower rollers. And in case it should be found necessary to cause the bands to run so obliquely that this method of guiding them should prove insufficient for the purpose, we propose to form each roller of a series of pulleys, each of which, as shown in Fig. 6, is secured to the roller-shaft by a species of universal joint, which permits the pulleys to accommodate themselves to the obliquity of the bands which run upon them.

The lengths of the raking and conveyer bands, if made of canvas, will vary under different circumstances. Thus, for example, in the morning, when the grain is moist with dew, the bands, being dampened, will contract in length, while as the dew dries up they will elongate again. In order to provide for this change in the lengths of the bands, and at the same time to keep them constantly under a sufficient strain to insure their efficient action, one of the rollers of each series of bands is made self-adjusting. This self-adjusting is effected in the machine we are describing by mounting the journals of the roller upon springs, which constantly tend to move it from the opposite roller of the series, thus straining the bands which run upon the two and permitting the roller to move sufficiently to accommodate itself to their varying lengths. This arrangement is shown at Fig. 2, $J^{20}$ being the springs, which bear upon the journals of one of the conveyer-rollers, $J^7$. The journals of the roller on which the springs act are supported in slotted boxes, which allow them to move sufficiently, and at the same time guide them in moving. In the present machine the upper roller, $J^7$, of the upper series of conveyer-bands, the lower one, $J^4$, of the lower series, and the outermost roller, J', of the raking-bands, are those to which this spring adjusting apparatus is applied.

As we have stated before, the grain is delivered by the conveyer upon an elevated platform, formed of rails B', whence it descends to the binding apparatus. This elevated platform extends over the driving-wheel C and slopes downward toward that side of the machine further from the rake. Its slope or inclination is sufficient to permit the grain to slide down freely by its gravity into a vertical crib, K, in which the grain is compressed into bundles or sheaves and encircled with the binding-cord.

In the machine we are describing the rake and conveyer work continuously, while the binding apparatus must of necessity receive the grain at intervals in order to convert it into sheaves. The conveyer is, therefore, continually delivering the grain upon the elevated platform, down which it slides toward the binding-crib. The descent of the grain is, however, stopped by a gate, K', which remains closed until the binding apparatus has formed a sheaf and discharged it, and is then raised to permit the descent into the crib of the grain which has meanwhile accumulated upon the elevated platform. This gate is composed of a series of teeth projecting from a horizontal stock, which is connected by radius-bars $K^2$ with pivots $K^3$, secured to the frame of the machine at points near the upper rollers of the conveyers. This gate remains down by its gravity until raised to permit the descent of the grain into the crib. When raised it moves up behind a fixed screen, $K^4$, which protects the gate-stock from the grain upon the platform. The raising of this gate is effected in the present instance by the rising of the compressor, in a manner we shall presently describe.

The compressing-crib, which receives the grain delivered by the raising of the gate, is formed of two parallel sets of ribs, $b$ $b'$, which inclose a space between them equal in breadth with the diameter of the sheaves to be formed. The ribs $b'$, at the inner side of the crib, pass down to the bottom of the frame of the carriage, where they extend across the crib in circular curves to form its bottom. The ribs at the outer side of the crib are divided into two sets, one of which, $b$, extends from the top of the frame to a cross-rail, $b^3$, and the other set, $b^4$, extends from the cross-rail to the bottom of the crib, which they partly cross in circular curves. These lower ribs are hinged at their lower extremities to the corresponding portions of the inner ribs, and are constructed to turn laterally upon their hinges, and thus form a gate for the discharge of the bound sheaf. The crib thus formed is traversed by the compressor $L^{12}$, whose office is to compact into a sheaf the loose grain dropped into the crib by the raising of the platform-gate, and to hold the sheaf thus formed until the binding is completed. This compressor consists in this instance of a compound beam, $c$, extending the whole length of the crib, and fitted with a series of inverted crutches or yoke-ribs, $c'$, which project from its lower edge and correspond in position with the stationary curved ribs of the crib. This compressor is constructed to traverse up and down in the crib upon guide-rods $L^{18}$, which are secured to the frame of the carriage. It is moved at the requisite intervals and held in the proper positions by the action of a cam, L, which is secured to the cam-shaft M of the binding mechanism. This cam, as shown in detail at Figs. 32 and 33, acts upon a friction-wheel, L', secured to the lower extremity of an upright bar, $L^2$, whose upper extremity is guided by a guide-box, $L^3$, while its lower extremity is also guided by being forked to traverse upon the cam-shaft M. The sliding bar $L^2$ is connected, by a link-rod, $L^4$, with an arm, $L^5$, projecting from a transverse rock-shaft, $L^6$, whose journals are supported in suitable boxes formed in plates $L^7$ secured to the frame of the machine. This transverse rock-shaft is fitted with a second arm, $L^8$, which is connected, by an adjustable connecting rod, $L^9$, with an arm, $L^{10}$, projecting from a longitudinal rock-shaft, $L^{11}$, that extends parallel with the compressor $L^{12}$. The extremities of this longitudinal rock-shaft $L^{11}$ are fitted with arms $L^{13}$, whose ends have wrist-pins $L^{14}$ secured to them, which are received in slots formed in lifting-levers $L^{15}$. These latter are pivoted at one of their extremities to the frame of the machine, while their other extremities are connected with the opposite traverse-blocks $L^{16}$ of the compressor-beam by means of suitable link-rods $L^{17}$. The operation of this mechanism is such that, as the cam is turned by the revolution of the cam-shaft, the compressor is alternately depressed, held stationary, and permitted to rise, which last operation is effected by the action of suitable springs, which, being connected with the arms $L^{13}$ of the longitudinal rock-shaft $L^{11}$, are extended when the compressor is depressed, and act by their tensive force to re-raise them, together with the compressor upon which they act, whenever the shape of the cam L permits them to rise.

The mechanism for effecting the binding of the sheaf is mounted upon a separate frame, which is removable from the frame of the machine, and which, being of small bulk, may be formed wholly of metal. The principal operations effected by this mechanism are, first, operating the compressor, by which the sheaf is formed as above stated; second, encircling the grain with cord from a reel or bobbin; third, severing the band or portion around the sheaf from that upon the bobbin and tying it into a knot; fourth, operating the discharger by which the bound sheaf is delivered from the machine. These principal operations are subdivided into secondary ones, which are all effected by the rotation of the cam-shaft of the binding mechanism acting, through the intervention of suitable cams, treadles, connecting-rods, and levers, upon the instruments which perform the work. This binding mechanism is represented in detail on a scale of six inches to the foot at Figs. 7 to 31, inclusive, to which this portion of our specification particularly refers. In these various figures the mechanical devices for effecting each movement are shown from their source of motion or the cam-shaft to the point at which they act.

The cord by means of which the grain is bound is contained upon a spool, N, which fits tightly upon a spindle, N', but can be removed when the cord upon it is used up to be replaced by a full spool. The spool spindle is fitted with a collar on which the spool-head rests, and with pins $d\ d$, which engage in corresponding holes formed therein, and thus cause the spool and its spindle to turn simultaneously. This spool-spindle is supported by a frame, $N^2$, connected with the frame of the binding mechanism. It is fitted with a pinion, $N^3$, whose teeth engage with those of a wheel, $N^4$, mounted upon a tubular shaft, $N^5$, parallel with the bobbin-spindle. The body of this wheel is traversed by the arms of a spring-clutch, $N^6$, which, passing through slots in the wheel, bear upon the face of a disk, $N^7$, on the opposite side thereof. This disk is faced with leather or some other soft substance, and the arms of the clutch are roughened to indent themselves therein. This disk is secured to a sleeve, $N^8$, which is constructed to turn freely upon the tubular shaft, and has a spring coiled upon it which tends constantly to turn the sleeve, together with the tubular shaft and cog-wheel, with which it is connected by the spring clutch, in such a direction as will effect the winding up of the cord upon the spool. The clutch is moved from the disk, to break the connection between the spring $N^9$ and the spool N, by means of a cam, $N^{10}$, upon the cam-shaft M, acting through a treadle, $N^{11}$, and a piston-rod, $N^{12}$, the last of which is contained within the tubular shaft $N^5$ and acts directly upon the clutch $N^6$. When the connection is thus broken, the spring, if previously contracted, tends to unwind it and regain its most distended form, which operation is limited by the striking of a pin, $N^{13}$, screwed to the disk $N^7$ against a fixed arm, $N^{14}$, secured to the spool-frame.

The cord from the spool is conducted through an eyelet in a bracket, $N^{15}$, to the inner extremity of a tubular cord-feeder, O, supported in suitable bearings upon the frame of the binding mechanism. The office of this cord-feeder is to present the extremity of the cord to a pair of nippers, by whose action a sufficient length of cord to encircle the grain delivered into the crib is drawn off. This cord-feeder is moved toward and from the adjacent side of the compressor (when the same is depressed) by the revolution of a cam, O', on the cam-shaft M acting through the intervention of a treadle, $O^2$, connecting-rod $O^3$, and elbow-lever $O^4$ upon pins $O^5$, which project laterally in opposite directions from the cord-feeder, and are received in slots formed in the longer forked arm of the elbow-lever. The cam acts to draw the cord-feeder inward, or from the compressor $L^{12}$, and to hold it in that withdrawn position until it is to be moved forward, which operation is effected by a spring, $O^6$, situated beneath the treadle $O^2$, and acting antagonistically to the cam O', and causing the shoe of the treadle to enter a notch in the cam whenever the latter turns to the proper position to admit it, and thus permit the outward or forward movement of the cord-feeder.

The cord-feeder is tubular, and the cord passes through it. It is essential that the cord should be held firmly by the cord-feeder while the latter is moving forward to feed it to the nippers, while at other times the cord must be permitted to run freely through the cord-feeder. This gripping and releasing of the cord is effected by a spring gripping jaw, P, which enters a slot formed in a protuberance, $O^7$, upon the cord-feeder, and is connected with a rod, P', that extends downward to a lever, $P^2$, beneath. This lever is pivoted at its middle to one of the side rails of the frame, and its opposite extremity is connected with a treadle, $P^3$, that is pressed upward by a spring, $P^4$. This spring tends to depress the rod P' and gripping-jaw P, and thus keeps the latter bearing upon the cord in the cord-feeder, while at the same time the length of the rod P' is such that it does not oppose any appreciable obstacle to the movement of the cord-feeder by its appropriate cam and spring. The gripping-jaw is raised when required to permit the free passage of the cord by the depression of the treadle $P^3$, which is effected by a cam, $P^5$, secured to the cam-shaft M.

The pair of nippers $e$, by which the cord presented by the cord-feeder is seized, are mounted upon the lower extremity of the nipper-stock $e'$, which is constructed to slide vertically in guides formed in a bracket, $e^2$, that projects laterally from the compressor $L^{12}$. This stock is pressed downward by a spring, $e^3$, and its downward movement under the action of this spring is limited by a pin, $e^6$. The pair of nippers is pivoted at the axis of its two jaws to that side of the stock which, when the compressor is depressed, faces the extremity of the cord-feeder. The opposite side of the nipper-stock, or that adjacent to the grain in the crib, is fitted with a fork, $e^5$, whose office will be hereinafter stated. From the connection of the nipper-stock with the compressor it is forced to travel with the latter, and is therefore depressed when the compressor is descending to compact the grain in the crib, and raised again when the compressor is raised to permit the passage of a fresh quantity of grain from the elevated platform.

The jaws of the pair of nippers are pressed toward each other by a pair of springs, $e^6$, which act upon the shanks of the nipper-jaws, and tend constantly to hold them closed. The jaws are opened when necessary by the action of a wedge-block, $e^7$, which is secured to the extremity of an arm, $e^8$, that projects from a rock-shaft, $e^9$. The latter is supported by a pair of standards, $e^{10}$, erected upon the frame of the binding mechanism, and is fitted with a second arm, $e^{11}$, which is connected by a rod, $e^{12}$, with a treadle, $e^{14}$, beneath. This treadle is operated at the proper periods to drive the wedge-block by means of a cam, $e^{13}$, upon the cam-shaft M. It is returned to its position to draw back the wedge-block by means of a spring, $e^{15}$, which acts upon its lower face in opposition to the cam. When the wedge-block is moved by the cam, it enters point foremost between the shanks of the pair of nippers, and thus causes their jaws to diverge or open, and when it is drawn back by the action of the spring, after the projecting portions of the cam have passed the shoe $e^{16}$ of the treadle $e^{14}$, it retrogrades from the shanks of the pair of nippers, thus permitting them to be forced toward each other and closed by the action of the springs $e^6$.

The nipper-stock in descending strikes against a forked standard, $n$, which is secured to the front plate of the frame of the binding mechanism. This standard is doubly forked to permit the passage of the cord through it in a direction at right angles with the compressor-beam, and also the passage of the tying-forceps in a direction parallel with the compressor-beam, and therefore at right angles with the cord.

The tying-forceps consist mainly of two jaws, $ff'$, and of a shank, $f^2$, to which they are secured. One of the jaws, $f'$, is fixed to the shank. The other, $f$, is hinged thereto so that it can move toward and from the fixed jaw, and thus open or close. In this opening and closing it is guided by a steady-pin, $f^3$, which projects from the inner face of the fixed jaw, and enters a slot in the movable jaw. The latter is pressed constantly from the fixed jaw by the action of a spring, which is inserted between the adjacent faces of the two jaws, and tends constantly to keep them open, and reopen them whenever the force by which they have been closed is removed.

The tying-forceps are constructed to traverse to and fro in the direction of their length in slotted standards $f^4$. They are moved forward or toward the forked standard $n$ by means of a spring, $f^5$, which bears against the extremity of their shank. It is caused to retrograde by the action of a cam, $f^6$, which acts upon a treadle, $f^7$, that is connected by a rod, $f^8$, with the shorter arm, $f^9$, of an elbow-lever, which is pivoted to the frame, and whose longer arm, $f^{10}$, is forked and fitted with a swivel-ring, $f^{11}$, through which the shank of the forceps passes. The opening in this swivel-ring is sufficient to permit the forceps to turn freely in whatever position it may be placed by the actions of the cam and spring, and the forceps are forced to move longitudinally with the swivel-ring and elbow-lever by means of two collars, $f^{12}$, which are secured to the shank of the forceps and embrace the opposite faces of the swivel-ring.

The formation of the knot on the binding-cord requires not only the longitudinal movement of the forceps, but also their revolution upon their axis and the opening and closing of their jaws. The turning of the forceps in one direction is effected by the operation of a cam, $f^{13}$, secured to the cam-shaft. This cam acts upon a treadle, $f^{14}$, which is connected by a rod, $f^{15}$, with the hinder arm, $f^{16}$, of a lever, which is pivoted to a standard upon one of the side rails of the binding mechanism, and has its longer arm formed into a toothed sector, $f^{17}$, whose teeth engage with those of a pinion, $f^{18}$, secured to the shank of the forceps. This pinion has sufficient breadth of face to be constantly in gear with the toothed sector in whatever position the forceps may be placed in their longitudinal movement. The returning of the forceps when the projections of the cam have passed the shoe of the treadle is effected by a spring, $f^{19}$, which bears upon the lower face of the treadle, and tends to keep its shoe in contact with the periphery of the cam.

The opening of the forceps is effected, as before stated, by the spring between their jaws. Their closing is effected by a spring, $g$, acting upon a treadle, $g'$, beneath the cam-shaft $g^2$. This treadle $g'$ is connected by a rod, $g^3$, with the hinder arm of a closing-lever, $g^4$. The latter is pivoted to the standard $g^5$, and its front arm is arranged to rise and fall in transverse slots formed in one of the standards in which the tying-forceps are supported. That extremity of the closing-lever which works in the standard is curved out to fit the exterior of the forceps. The treadle $g'$ is depressed, whenever the forceps are to be opened by the spring between their jaws, by means of a cam, $g^2$, upon the cam-shaft; and when the projecting portions of this cam pass the treadle-shoe $g'$ the spring raises the treadle, thus depressing the front arm of the closing-lever upon the forceps and forcing their jaws to close. In order that the treadle-spring may perform its work efficiently, it must be made considerably stronger than the forceps-spring, whose tension it has to overcome in depressing the closing-lever upon the forceps.

The office of the forceps is to close upon the extremities of that portion of the cord which has been extended around the grain in the crib, to form them into a loop, to hold them while their ends are turned and projected through the loop, to form a knot, and to permit the knot thus formed to escape. The projection of the ends of the cord through the loop formed by the forceps is effected by a finger, $h$, which projects from the front end of a finger-stock, $h$; and in order that the ends of the cord may be tightly stretched across the loop, to insure their being caught and pushed through by the end of the finger, their passage between the prongs of the fork $n$ should be slightly retarded by a spring, $n'$, which bears against them. The finger-stock is constructed to slide toward and from the crib in slots formed in the standards $h^2 h^2$. It is moved to and fro at the proper moments by means of a cam, $h^3$, and spring, $h^4$. The cam $h^3$ is secured to the cam-shaft M, and acts upon a treadle, $h^5$, on whose lower face the spring bears. This treadle is connected by a rod, $h^6$, with the shorter arm, $h^7$, of an elbow lever, which is pivoted to the side rail of the frame, and whose longer arm, $h^8$, is forked and embraces a wrist-pin, $h^9$, that projects from the side of the finger-stock. The cam in turning depresses the treadle $h^5$ and forces the finger $h$ forward to push the ends of the cord through the loop. When its projecting portion has passed the treadle shoe, the treadle is raised by the spring beneath to withdraw the finger to its first position.

Those sections $b^4$ of the outer ribs of the crib which form the gate to permit the escape of the bound sheaf are all linked together by a connecting-rod, R, so that they are compelled to turn simultaneously upon their hinges. This connecting-rod is connected by a link, $R'$, with the upper extremity of an arm, $R^2$, that is pivoted transversely to the outer extremity of a rock-shaft, $R^3$. The latter extends inward across the frame of the crib, and is fitted at its inner extremity with an arm, $R^4$, (shown in detail at Figs. 23 and 25,) which is connected by a rod, $R^5$, with a slide, $R^6$. The latter is supported in slotted standards $R^7$, secured to the frame of the binding mechanism and moved longitudinally to rock the shaft $R^3$, and thus turn down to depress the sections of the gate by means of a cam, $R^8$, upon the cam-shaft, acting upon a shoe, $R^9$, upon the slide. The rock-shaft $R^3$ is turned back to its first position, and thus turns up the sections of the gate by means of a spring, $R^{10}$, Fig. 4, which, being connected with an arm, $R^{11}$, secured to the rock-shaft $R^3$, is extended whenever the slide $R^6$ is moved by the cam, and as soon as the cam ceases to act contracts again to move the rock-shaft, the gate, and the slide to the positions which they severally occupied before the cam began to act.

In binding the sheaf it is necessary that that portion of the cord which encircles it should be severed from the rest. This severing is effected at the proper moment by a pair of shears, one blade of which is stationary and the other is movable. The stationary blade S is secured to a standard, $S'$, in such a position that the cord-feeder O can move to and fro above its edge. The movable blade or knife $S^2$ is secured to a stock, $S^3$, which works up and down in a slot in a bracket, $S^4$, that projects from the standard $S'$, which supports the fixed blade S. The lower extremity of this stock is connected with a compound treadle, $S^5$, which is depressed by a cam, $S^6$, and raised by a spring, $S^7$. The object of using a compound treadle is to obtain the requisite motion with a comparatively slight angular movement of the cam. The back of the movable blade $S^2$ is firmly secured to the stock $S^3$. Its front is received in a groove formed in the standard $S'$, by which it is guided in moving. The cutting-edge is formed upon the lower side of the blade. When the stock is raised this edge is sufficiently above the track of the cord-feeder to permit the latter to move freely beneath it. The cutting-edge of this blade is inclined in order to produce a drawing cut, and this drawing action is enhanced by permitting the stock to move laterally in its slot in the bracket, while at the same time a too great movement is prevented by the action of the spring $S^8$, which tends constantly to press the blade $S^2$ toward the grooved standard in which its front side slides.

To protect the cord from being drawn against the knife and severed while running from the cord-feeder, a rounded guard-bar, $S^{10}$, Fig. 10, is placed between the knife and the crib a little above the track of the cord feeder, so that as the cord is taken off by the nippers it is held down by the bar until it has passed the knife.

The various cams upon the cam shaft bear a mutual relation to each other, so that they actuate the instruments to which they give motion in their proper relative order. As they are all secured to the same cam-shaft, they are turned simultaneously by its revolution. The cam-shaft is fitted with a cog-wheel, $M'$, whose teeth engage with those of a pinion, $M^2$, secured to a sleeve, $M^3$, above. This sleeve is fitted with a second wheel, $M^4$, whose teeth engage with those of a second pinion, $M^5$, which is secured to a shaft, $M^6$. This shaft is supported by the standards $M^7$ of the frame of the binding mechanism. It is fitted with a conical belt-pulley, $M^8$, to which a rotary motion is imparted by a belt that is driven by a corresponding reversed conical pulley, $M^9$, secured to a shaft, $M^{10}$, near the hinder side of the machine. This shaft is driven by a pinion, $M^{11}$, which gears into an intermediate wheel, $M^{12}$, which in turn gears into the main driving cog-wheel D. The object of the intermediate wheel is to permit of the raising and lowering of the carriage-frame upon the running-wheels without breaking the connection between the toothed driver D and the pinion $M^{11}$. In order that the intermediate wheel may move to accommodate itself to this change in the relative positions of the driver and pinion, it is pivoted in a swinging frame, T, which permits it to rise and fall with the depression and elevation of the frame of the machine, and at the same time holds it in the proper position for engaging with the teeth of the pinion. The swinging frame T is constructed to turn upon the pulley-shaft $M^{10}$ as an axis, and is secured in any desired position by means of a screw, $T'$.

The pulley-shaft $M^{10}$ is fitted with a pulley, U, from which a belt is conducted to the corresponding pulley $U'$, secured to a counter-shaft, $U^2$, near the front of the machine, which is thus caused to revolve by the rotation of the driving-wheel D. This counter-shaft is fitted with a second pulley, U³, from which a belt is conducted to a pulley, U⁴, upon the crank-shaft H⁷, which operates the sickle. It is also fitted with a third pulley, I⁴, from which a cord is conducted to the pulley I³, secured to the shaft of the reel I². The upper roller, J⁵, of the inner conveyer-apron is caused to revolve by a belt or cord that encircles pulleys J²¹ J²², secured respectively to the crank-shaft and to the roller-shaft. The upper roller of the outer conveyer-apron is driven from the inner one by means of a pair of cog-wheels, J⁹ J¹⁰, secured to the shafts of the two. And, finally, the inner roller of the raking-bands is driven by cog-wheels J²³ and J²⁴, secured respectively to its shaft J², and to the shaft of the adjacent roller J⁸ of the conveyers-apron, so that all the acting members of the machine are caused to move by the revolution of the driving-wheel C.

We have already described the operation of the sickle, the rake, and the conveyer in treating of these several apparatus. We have also traced the cut grain to its delivery upon the elevator-platform, and to its stoppage there by the action of the platform-gate. It remains for us to describe the operation of the binding mechanism.

In commencing this description we will suppose that a bound sheaf has just been discharged from the machine, that the discharging-gate $b^4$ has closed, and that the compressor L is in the position to which it was allowed to rise under the action of the compressor-springs, to leave the bound sheaf free to pass out of the discharging-gate. The cam-shaft is at this time in such a position that the compressor-cam is acting upon the friction-roller L′ at the point. Consequently, as the cam-shaft turns in the direction indicated by the arrow in Fig. 33, the sliding bar is raised and the compressor correspondingly depressed. When the compressor reaches the lower extremity of its downward stroke it is held stationary for a short period by the action of the concentric portion $i$ of the compressor-cam. During this period the cam-shaft continues to turn, and the pair of nippers $e$ are opened by the action of the appropriate cam $e^{13}$. As soon as the pair of nippers have opened, the cord-feeder O is projected forward to feed the extremity of the binding-cord between the nipper-jaws. When this is effected, the pair of nippers $e$ are permitted to close under the action of the nipper-springs and gripe the cord firmly. The moment this is accomplished the clamp P is raised by its cam P⁵ to free the cord in the cord-feeder. The compressor L is then permitted to rise to its highest limit. As it rises it draws off the cord from the spool N, which, in turning, winds up the spool spring N⁹, thus keeping a constant strain upon the cord drawn off. As the compressor approaches its highest position the extremities of its beam, striking the lower sides of hooks K¹⁰ which project from the outer extremities of the radius-bars K² of the platform-gate K′, carry this gate up with the compressor, and thus permit the grain that has accumulated upon the platform B′ during the formation of the preceding sheaf to slide into the crib. As the grain enters the crib it deflects the binding cord, as shown in Fig. 3, previously extended downward in a straight line from the pair of nippers to the binding mechanism, and which now, as shown by a crooked line in Fig. 3, extends outward from the pair of nippers, down the outer side of the grain fallen into the crib, and thence inward beneath the same, and through the forked standard $n$ to the cord-feeder O. This deflection is accompanied by the unwinding of more cord from the spool, and consequently a still greater winding up of the bobbin-spring. The compressor is permitted to remain at its highest position a sufficient length of time to permit the passage of the mass of grain from the platform to the crib by the shape of that portion of the compressor-cam which is acting at the time. This portion $i$ of the cam is concentric, so that, although the cam-shaft turns without interruption, no motion is imparted by this portion of the cam to the sliding bar L². When the mass of grain has passed into the crib, the compressor is depressed. As it descends to compress the grain, the platform-gate is lowered to shut off the passage of grain from the platform, as continually fresh quantities are being delivered thereon by the continuous action of the sickle, the rake, and the conveyer. As the compressor continues to descend, the slack of the binding-cord, caused by the approach of the pair of nippers to the binding mechanism, is rewound upon the spool as fast as formed by the action of the spiral spring N⁹, so that when the compressor approaches its lowermost position the cord is strained by the force of the spring around the compacted grain. The pair of nippers $e$ is held in such a position by the stock from which they project, that in descending with the compressor, they pass on the inner side of the forked standard, so that the extremity of the cord held by them is strained across the forked standard $n$, and lies upon that portion extending from the cord-feeder O, while the forked plate $e^5$, which is secured to the outer side of the nipper-stock, passes down the outer side of the forked standard $n$, and, embracing the cord extending from the pair of nippers to the grain between their two prongs, prevents it from rising or moving laterally. The compressor does not descend at once to its lowest limit, but stops when the bottom of the nippers-stock strikes the upper extremity of the forked standard $n$, and remains stationary a short period in this position to give time for the seizing of the cord by the tying-forceps $f$, which have been opened by the action of the appropriate cam during the descent of the compressor. The tying-forceps are now advanced into the forked standard, the upper jaw passing above and the lower jaw passing beneath the two extremities of that portion of the cord around the sheaf which have been stretched across the standard. As soon as the forceps have advanced sufficiently to receive the cord in the notches $v$, their jaws are closed by the closing lever. They are then drawn back a distance about equal to their diameter, and at the same time the compressor is depressed still farther to lessen the circumference of the sheaf, and thus permit the cord to be drawn along by the forceps. When the latter have reached their backward position, they are turned three quarters round by the action of the toothed sector $f^{17}$ upon the forceps pinion $f^{18}$, thus twisting the loop formed by their backward movement and causing the cord to cross their forked extremity. The forceps are then advanced through the forked standard to push forward the loop formed in it until it arrives opposite the extremity of the finger $h$, and as this movement takes place the cord is severed by the action of the shears S $S^2$ just in front of the cord feeder O. The jaws of the nippers $e$ are also opened at this time to release the extremity of the cord which they had previously seized. By this advance of the forceps the extremities of the cord or band around the sheaf, which are on the inner side of the forceps, are received into the groove $v'$ in the side of their jaws, and are moved directly across the front notched extremity of the finger $h$. The latter is then advanced to push these extremities through the loop of cord in the forceps, thus completing the knot. As soon as the finger has completed its work, it is withdrawn to its first position. As it leaves the forceps, the latter are retrograded a short distance to bring the slack knot to the middle of the forked standard, and are turned the remaining quarter of a revolution. They are now permitted to open by the rising of the closing-lever $g^4$, and at the same time the compressor is permitted to rise and release the grain. The latter tends to expand from its compressed form, thus straining the band, drawing its knotted extremities from the open tying-forceps, and tightening the knot. The bound sheaf in its expansion presses against the inner ribs, starts itself outward, and rolls laterally out of the opening left by the discharger-gate, which has meanwhile been depressed by the action of its appropriate cam.

While the knot has been forming the thread-clamp P has been permitted to reclamp the thread in the cord-feeder O. The spool-spring $N^9$ has also been disconnected from the spool to permit it to assume its relaxed state, after which it has again been connected therewith. While the sheaf is rolling out of the machine the tying-forceps are closed and are turned back a complete revolution, to be ready to act again, and after the sheaf has escaped the discharging-gate is raised again to close the opening in the side of the crib.

The operations we have described have been effected by a single revolution of the cam-shaft, and the several members of the binding mechanism have attained the proper positions for commencing the binding of a new sheaf, the first operation being the descent of the compressor and the seizing by the pair of nippers $e$ the end of the cord presented by the cord-feeder O.

As some of the operations we have described are effected simultaneously with others, we have prepared the diagram Fig. 8, which shows the relative angular distances through which the cam-shaft moves to perform the various operations and the order in which they are effected.

The various parts of the machine we have described may be modified to a very great extent without overstepping the limits of our invention; and we have devised numerous modifications, some of which may by different constructors be deemed preferable to those we have thus far described. We will therefore proceed to indicate briefly such of these modifications as we believe to be the best.

The sickle may be modified by constructing the blades of flat plates, which may be conveniently formed by grooving a plate of steel in a planing-machine and cutting it, either obliquely or at right angles to the grooves, into blades of a suitable width, which are then secured to the stocks. When formed in this manner, it will have the section represented at Fig. 34, the ribbed or grooved surfaces of the blades being outside and meeting at a sharp angle to form the compound cutting-edge. The grooves on the two blades may be inclined in opposite directions to the edge. The method we have described of forming ribbed sickle-blades, whose serrated cutting-edges are renewed by simply beveling off the front edge on the smooth side, may also be applied to sickles with single blades.

The advantages we have stated as resulting from the compound jumping movement we have described may be attained to a certain degree by dividing the movement between the two blades of the compound sickle. Thus, for example, the upper blade may be arranged to move to and fro with a succession of short vibrations, while the lower one is moved simultaneously to and fro beneath the upper, but with longer and slower strokes, or the relative movements of the two may be reversed. The mechanical devices for communicating this compound movement to the sickle-blade may also be varied. Thus, for example, eccentrics may be used in place of cranks, and instead of using an elbow-lever pivoted to a swinging arm the latter alone may be employed. In this case the connecting-rod should be joined near its middle, and be deflected alternately up and down or to the right and left, so as to vary its effective length, and thus produce short vibrations, while the swinging arm is imparting to it a longer and slower stroke. Such an arrangement is shown at Fig. 35. The same compound movement may be produced by the rotation of a single shaft instead of employing two for the purpose. A very convenient way of effecting this object is to apply an eccentric toothed cam to the shaft, the blade or connecting-rod being kept in contact with the cam by a spring, as shown in Fig. 36.

Instead of adjusting the cutting-blade upon its stock to bring its cutting-edge into the proper position with respect to the stubble-guard and shield, the blade and stock may be moved forward together, or the shield or stubble-guard, or both, may be made adjustable for the purpose of setting them and the knife from time to time into the proper relative positions.

The water for moistening the sickle-blades may also be applied to their outer or inner surfaces, or to both. We consider this portion of our invention of great practical importance, as it prevents the "gumming," as it is commonly called, of the sickle, which has proved to be one of the greatest impediments to the successful cutting of grass and grain by machinery. The water prevents the gummy matter from drying, and dissolves and washes it from the sickle. This water may be applied in various ways, and may also be used in a hot state by making the reservoir in the form of an annular boiler having a small furnace within it.

It may also be found advisable to dissolve alkalies or other substances in the water to augment its cleansing properties. Substances may be used which will act to saponify the gummy matter, and also to convert it into a lubricating compound, which will facilitate the movement of the sickle-blades. In such cases, however, the sickle and other portions of the machine connected therewith, should be carefully washed at the close of each day's work to prevent them from rusting. The upper blade may be perforated to allow the water to ooze through it from within to keep its upper surface wet.

The raking mechanism may be driven directly from the shaft, instead of through the conveyer, by means of a suitable belt and belt-pulleys, or by shafting and cog-wheels, or by shafting, the sections of which are connected by universal joints, as may be deemed most suitable. It may also be found advisable to support the upper members of the raking-bands at points between the two end rollers upon intermediate rollers. The rollers may also be divided transversely into sections whose adjacent extremities are supported by intermediate bearing-rails inserted between the front and back rail of the raking-platform. It may also be found advisable to stud the bands with teeth to prevent the slipping of the grain.

The conveyer may be modified in various ways. Thus, for example, the bands may, by means of suitable rollers, be made to assume the configuration of the mold-board of a plow, and thus receive the grain horizontally and deliver it upon end, by which means the sheaf may be formed upright instead of horizontally.

The raking and conveying bands may also be connected, so that the same bands extend from the extreme roller of the raking apparatus to the extreme one of the conveyer. Such an arrangement may be expedient in a machine in which the grain is to be conveyed horizontally, but whenever the direction of movement is changed so as to require the deflection of the bands, we think it best to divide the raking and conveying bands at the point of deflection, as we have done in the machine we have described.

The elevator, instead of being composed of a series of independent endless bands, each armed with a series of teeth, may be made of an endless series of rake-heads linked together and carried around in endless succession on drums, as shown in perspective at Fig. 36ᴬ.

The elevated platform instead of being stationary and permanently inclined may be supported on pivots, and arranged to tip the grain received upon it into the binding-crib. This tipping should be effected at the proper moment by means of a cam upon the shaft of the binding mechanism. Such an arrangement may be deemed advisable by some constructors, as it dispenses with the necessity of employing the platform-gate to shut off the passage of the grain to the crib, which operation may be effected by simply bringing the platform to a horizontal position. The pivots of such a tipping platform may be arranged either near the middle of its sides or near its upper or lower edges, as may be deemed advisable. By constructing the tipping platform as shown in Fig. 36ᴱ, it may be used both as a conveyer and platform. When its inner curved edge is depressed, it will receive the grain from the rake, and when raised up, as shown by the red lines in Fig. 36ᴮ, the grain will slide off into crib to be bound.

The platform-gate in the machine above described is constructed to rise and fall. Such a gate may in many cases be replaced with advantage by a rotating gate consisting of two or more series of arms projecting radially from a common axis, which is turned at invals, but always in the same direction, to move one set of arms out of the way of the grain and to bring a fresh set into a position to act when the grain has passed into the crib. Such a gate will be similar to that of the ordinary turnstile laid upon its side. It may be arranged to act not only as a mere gate, but also as a feeding apparatus to drive the loose grain quickly into the binding-crib.

The compacting of the grain may be effected by compressors of various forms and arrangement, but all of which produce the same result—that is to say, the compacting of the loose grain into a bundle or sheaf. The various modifications we have devised for effecting this purpose are so numerous that it would be impossible to describe them all within the limits of this specification. We will, therefore, specify those only which we deem it most important that constructors of these machines should be made acquainted with.

Instead of employing a compressor which extends unbroken throughout the whole length of the binding-crib, a compressor of sections may be employed. Thus, for example, the compressor may be composed, as shown at Fig. 38, of two crutchet-formed levers, which are pivoted by their butts at the opposite extremities of the crib, and which are turned up to admit the grain and release the sheaf, and are turned down to effect the compression. In this case, as in that of others we shall mention, it will be advisable to operate the pair of nippers by a separate arm, as shown at Fig. 39, which projects from a rock-shaft.

The compression may also be effected partly from above and partly from beneath, and this method admits of numerous modifications. Thus, for example, the bottom of the crib may be formed of ribs secured to a beam similar to the present compressor, and this movable bottom may be made to rise either simultaneously with the descent of the upper compressor or subsequent thereto; or the compression may be effected by two series of curved arms attached to separate rock-shafts, as shown at Fig. 40, in which case the operation will be analogous to that of compressing a sheaf by the human arms. In order that these mechanical arms may act efficiently, their extremities should be extended sufficiently to enable them to embrace enough grain in a loose state to form a sheaf, and those in one set should be arranged to pass by those of the other in closing upon the grain to effect the compression. This arrangement of compressing-arms may be modified by arranging the rock-shafts of the two sets at opposite sides of the crib; or one set of arms may be used in the place of the rising and falling compressor we have before described.

The compression may also be effected wholly from beneath by reversing the arrangement of the crib, closing it at the top with curved ribs, and inverting the compressor. In this case the grain received upon the compressor will be raised and compacted against the stationary curved ribs which close the top of the crib. This arrangement is advantageous from the facility with which the discharge of the bound sheaf may be effected, for the ribs of the compressing-beam may be secured to the extremities of standards, and projected upward between inclined discharging-bars, as shown in Fig. 41. In this case, the compressor, in descending, will leave the sheaf upon the bars, as the ribs are drawn down between them, and no discharging-gate will be required. The loose grain, however, must not be admitted into the crib until the compressor has raised sufficiently to close the opening through which the sheaf has passed. Instead of actuating the compressor by means of a single cam, two cams may be used, which act in succession—one to give the quick movement to the compressor when but little resistance is to be overcome, and the other to act when a great compressing force is to be exerted with but little motion.

The different mechanisms we have described for effecting the compression may be varied by combining parts of each. Thus, for example, the inverted compressor we last described may be replaced by one set of the curved arms, represented at Fig. 40. The stationary ribs, which form the top of the ribs, may also be replaced by a second set of curved arms, which, in this case, may be made to perform the duty of a gate to shut off the supply of grain from the platform or conveyer during the formation of the sheaf.

The compressor may also be constructed in such manner that it performs the duty of conveyer as well as its own peculiar functions. Thus, for example, it may have the form of a hand-rake, as shown at Fig. 42, which, advancing toward the farther extremity of a platform upon which the grain is delivered by the raking apparatus, passes over the grain and descends beyond it, after which it, in its retrograde movement, draws the grain backward and compresses it between its curved teeth and a series of stationary teeth, or the equivalent thereof, which form a binding-crib.

The compressor may also be made to perform its duty by compressing the grain horizontally, and some of the devices we have mentioned are well adapted to this method of operation. Such a compressor may, however, have the form of a series of large forceps with curved jaws, as shown at Fig. 43, which are opened to admit the grain and closed to compress it. This arrangement may be varied by inverting these forceps and arranging them to travel from the platform on which the grain is delivered by the rake to the point at which the sheaf is discharged, so that it may open, descend upon the mass of grain, embrace it, compress it, and hold it during the binding, after which it may deliver the bound sheaf at the side or back of the machine.

Again, a horizontal compressor may consist of two series of ribs, which, as shown at Fig. 44, are arranged to move in doubly-curved lines, so that they are forced to assume in succession the positions in which they are represented in red, black, and blue lines in the figure, and thus open, compress, and drop the sheaf.

The discharging of the bound sheaf may not, in some cases, be effected with sufficient speed when this is done solely by its own weight and elasticity. In such cases we propose to eject the sheaf from the binding-crib by means of suitable mechanism, which may either be operated by a cam on the cam-shaft of the binding mechanism, or by some independent apparatus which produces the wished-for result at the proper moment. Thus, for example, a horizontal piston-crutch may be arranged to traverse the lower portion of the binding-crib, as shown at Fig. 45; or the lower portions of the inner ribs of the crib may be connected with a rock-shaft, as shown at Fig. 46, and turned outward to eject the sheaf. The same result may be attained by forming the bottom of the crib of crutch-shaped ribs, which are all connected to a horizontal beam or shaft, as shown at Fig. 47, so that by turning the shaft outward the sheaf lying upon its ribs will be thrown from the machine, after which the shaft must be turned back again to aid in the formation of a new sheaf. This arrangement may be varied by attaching a series of such crib-bottoms to a shaft, as shown at Fig. 48, and turning the latter at intervals and always in the same direction, by which means one crib-bottom and the sheaf thereon will be moved out of the crib, and the next succeeding crib-bottom in the series will be brought into a position to receive the grain. A discharger of this description may be varied to perform not only its own peculiar functions, but also to effect the compression of the grain. Thus, for example, the extremities of the ribs may be prolonged and curved, as shown at Fig. 49, so that each series may seize the grain in succession and compress it against a series of arms, which, being subsequently withdrawn, will permit the further turning of the ribs to eject the sheaf from the machine. Again, this arrangement may be varied by combining the rotating discharger with a rotating compressor, the two having the general form of two wheels of comparatively small diameter and great breadth, which, as shown at Fig. 50, turn like a pair of crushing-rolls upon parallel shafts or axes, so that their arms form cells in which the loose grain is received and compressed, and from which the bound sheaf is permitted to drop.

We have already stated that the cord-nippers may be operated by a separate arm, instead of connecting it with the compressor; but the method we have described of effecting the surrounding of the sheaf with cord, by causing the grain to pass across the track of the pair of nippers, may be replaced by others. Thus, for example, the pair of nippers may be secured to the arm of a crank which is caused to rotate round the grain. Such an arrangement is shown at Fig. 51; or a jointed arm like that shown in Fig. 52 may be employed to produce the same result. Such an arm may be composed of wedge-formed links jointed together at their larger ends, and connected by a cord at their small ends in such manner that when projected from a case it shall assume a curved form and carry the band round the sheaf. Instead of carrying one cord entirely around the sheaf, two cords may be employed, each of which passes half-way round, and which are united by knotting their extremities on opposite sides of the sheaf.

The opening of the pair of nippers may be effected by a descending wedge-block instead of one moving horizontally, or nearly so. The wedge-block may also be secured to a straight bar and be moved in a straight line instead of in a curved line; or the pair of nippers may be opened by a pair of diverging levers, or they may be opened by twisting a bar between them, or by means of toggle-joint levers placed between them, and by various other contrivances too obvious to need description.

The various members of the binding mechanism may be varied to an almost endless extent. Thus, for example, the relative positions of the cams and treadles may be reversed, the latter being arranged above the former. Such a modification of the arrangement of the cam and treadle of the cord-feeder is shown at Fig. 53. Spiral springs may also be used in the place of plate-springs, as represented in the same figure; or springs of india-rubber or wood may be employed, if deemed most suitable. The treadles may also be arranged at the sides of the cams, an example of which is shown at Fig. 54.

Again, the return movements of the various members of the binding mechanism may be effected by cams as well as the direct movements, or the cams may give to the levers a double movement, as shown as Fig. 55. Such a modification, if applied to all, will require double the number of cams.

The cam-shaft also, in place of being parallel in direction with the shafts of the running-wheels, may be at right angles or oblique thereto, but such an arrangement would require the employment of beveled gear or guide pulleys or their equivalents to change the direction in which the driving belts run.

The machine we have described is adapted to binding each sheaf with a single band; but it will be obvious to the skillful mechanic that the binding mechanism may be modified to bind the sheaf with two or more bands without increasing the number of cams, and by merely duplicating some of the other parts of the mechanism. Thus, for example, if two bands are to be tied, two forceps will be required, and these may both be moved simultaneously by the same cam and counter-spring.

The construction of the forceps may be varied to a great extent. Thus, for example, the jaws may be formed in one piece with the spring, which causes them to diverge or open, as shown at Fig. 56, where the thin curved connection constitutes the spring; or the jaws may be pressed toward each other by this spring connection, and opened by a reciprocating wedge-block working within them, as shown at Fig. 57; or the reciprocating wedge-block may be arranged to act at right angles with the forceps. Again, the two jaws may be formed with shanks, which are pivoted near their middles to the extremity of the sliding rod or stock to which they are secured.

The closing-lever may be replaced by a pair of levers acting like the jaws of a pair of tongs, and embracing the forceps-jaws between them, or by a ring which is moved to and fro upon the forceps to press their jaws together.

Having thus described our improvements in machines for cutting, raking, and binding grain, together with various modifications of which the same are susceptible, what we specifically claim is—

1. The combination of a continuously-acting rake with a binding mechanism acting intermittently, substantially as herein set forth, which, among other things, gives the director of the machine an opportunity to observe the rate at which the grain for each sheaf is accumulating, so that by hastening or retarding the operation of the binding mechanism, by shifting the belt on the cone pulleys, he can make the sheaves nearly of uniform size.

2. The method of compressing the loose grain into sheaves vertically instead of horizontally, whereby, among other advantages, the lateral dimensions of the machine are considerably diminished, which adapts it the better to running between stones and other obstructions, and enables it to cut the outside swath round a field with less trampling and waste of the grain.

3. The shifting conveyer, by means of which sheaves of varying length may be bound round the middle without changing the relative positions of the cutting and tying machine, substantially as herein set forth.

4. The combination, in a grain-harvester, of the two series of bands, one or both armed with teeth, for the purpose of carrying the grain from the rake to the binder, as herein set forth.

5. The combination of a shifting stripper with a conveyer, substantially as herein set forth.

6. The combination of the discharging-gate, or the equivalent thereof, with the receiving-platform and the binding-crib, substantially as herein set forth.

7. The traveling cord-nippers e, or their equivalents, operating substantially as herein set forth.

8. The combination of the cord-clamp P with the cord-feeder o, substantially as herein set forth.

9. The method, substantially as herein set forth, of drawing the binding-cord round the sheaf with the proper degree of tightness preparatory to tying, by means of a spring operating upon the cord-spool, substantially as herein set forth.

10. The traversing movement of the tying-forceps in alternately opposite directions, in combination with their opening and closing movement, whereby the two ends of the band may be laid together and may then be grasped by the forceps to be tied, thus dispensing with a finger to thread the cord through the eye of the forceps.

11. The pronged standard n, in combination with the tying-forceps f and the finger h, or their equivalents.

12. The method of rendering slack cord to facilitate the tying of the band by lessening the diameter of the sheaf as the cord is taken up in making the knot.

13. The arrangement of the cord-nippers upon a sliding stock pressed down by a spring which yields to allow the stock to stand still while the compressor which carries it is moving, substantially as herein set forth.

14. The retarding of the cord by means of a brake, or the equivalent thereof, applied at some point between the place at which the knot is tied and the extremities of the cord, to insure the stretching of its ends across the loop preparatory to their projection through it in the operation of tying the knot, substantially as herein set forth.

15. The arrangement of the sides and bottom of the binding-crib so that it can be depressed to permit the discharge of the sheaf, substantially as herein described.

16. The arrangement of the cutting and binding mechanism on opposite sides of the driving-wheel, substantially in the manner and for the purposes herein set forth.

In testimony whereof we have hereunto subscribed our names.

P. H. WATSON.
E. S. RENWICK.

Witnesses:
S. W. WOOD,
JOHN L. SMITH.